(12) United States Patent
Ikeda

(10) Patent No.: US 7,946,555 B2
(45) Date of Patent: May 24, 2011

(54) ROTATIONAL ANGLE SENSORS AND THROTTLE DEVICES

(75) Inventor: Tsutomu Ikeda, Tokoname (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 762 days.

(21) Appl. No.: 11/935,009

(22) Filed: Nov. 5, 2007

(65) Prior Publication Data
US 2008/0121831 A1 May 29, 2008

(30) Foreign Application Priority Data

Nov. 16, 2006 (JP) .................... 2006-310135
Nov. 16, 2006 (JP) .................... 2006-310138

(51) Int. Cl.
*F16K 31/02* (2006.01)
(52) U.S. Cl. .................. 251/129.11; 324/207.25
(58) Field of Classification Search ......... 251/129.01, 251/129.11; 324/207.25, 207.2, 207.21; 29/592.1; 123/399, 339.14
See application file for complete search history.

(56) References Cited

U.S. PATENT DOCUMENTS

| | | | | | |
|---|---|---|---|---|---|
| 2,362,583 | A | * | 11/1944 | Piperoux | 425/129.1 |
| 5,010,263 | A | * | 4/1991 | Murata | 310/68 B |
| 6,819,102 | B2 | * | 11/2004 | Hagio et al. | 324/207.25 |
| 6,883,494 | B2 | | 4/2005 | Kurita et al. | |
| 7,275,517 | B2 | * | 10/2007 | Kurita et al. | 123/399 |
| 2004/0129909 | A1 | * | 7/2004 | Wiese | 251/129.04 |
| 2005/0073299 | A1 | * | 4/2005 | Yoshikawa et al. | 324/207.25 |
| 2005/0155780 | A1 | * | 7/2005 | Hannewald | 174/48 |
| 2007/0247143 | A1 | * | 10/2007 | Ikeda et al. | 324/207.25 |

FOREIGN PATENT DOCUMENTS

JP 2005048671 2/2005

* cited by examiner

*Primary Examiner* — John K Fristoe, Jr.
*Assistant Examiner* — Marina Tietjen
(74) *Attorney, Agent, or Firm* — Dennison, Schultz & MacDonald

(57) ABSTRACT

The present invention includes a rotational angle sensor having a magnetic detection device. The magnetic detection device includes a sensing section that can detect a change of a magnetic field produced by at least two magnets attached to a rotary member. A housing member is molded integrally with the magnetic detection device and a support member. The support member may serves as a protective member for protecting at least the sensing section of the magnetic detection device or may serve as a positioning member configured to enable at least the sensing section to be positioned relative to the positioning member.

32 Claims, 18 Drawing Sheets

ROTATIONAL ANGLE SENSORS AND THROTTLE DEVICES

This application claims priority to Japanese patent application serial numbers 2006-310135 and 2006-310138, the contents of which are incorporated herein by reference.

BACKGROUND OF THE INVENTION

1. Field of the Invention

The present invention relates to rotational angle sensors. The present invention also relates to throttle devices having the rotational angle sensors.

2. Description of the Related Art

Japanese Laid-Open Patent Publication No. 2005-48671 teaches a known throttle device that is operable to control an amount of flow of intake air that is supplied to an engine of an automobile. The throttle device includes a throttle valve for controlling a degree of opening of an intake air channel depending on the rotational angle of the throttle valve. Magnets are attached to an end portion of a shaft of the throttle valve. A rotational angle sensor having a magnetoresistive element is operable to detect the change of direction of the magnetic field produced by the magnets. The magnetoresistive element is integrated with a cover member by an insertion molding process. The cover member is adapted to cover a drive mechanism for rotatably driving the throttle valve.

The magnetoresistive element of the throttle device of this publication is integrated with the cover member by an insert molding process. Therefore, there is a possibility that the magnetoresistive element, in particular a chip constituting a sensing section, may be damaged by the molding pressure during the molding process. In addition, the chip of the magnetoresistive element may be deformed to cause deflection by the stress that may be produced due to contraction of a molded resin after the molding process. As a result, output characteristics of the magnetoresistive element may be degraded. The output characteristics may include the linearity of output and the output drift that may be caused due to change in temperature.

International Publication WO 2004/031558 teaches another known throttle device that is operable to control an amount of flow of intake air supplied to an engine of an automobile. Similar to the above known throttle device, the throttle device of this publication includes a throttle valve for controlling a degree of opening of an intake air channel depending on the rotational angle of the throttle valve. Magnets are attached to an end portion of a shaft of the throttle valve. A rotational angle sensor having a magnetoresistive element is operable to detect the change of direction of the magnetic field produced by the magnets. The magnetoresistive element has connecting terminals connected to plate-like terminal members, so that substantially the entire magnetoresistive element including a sensing section extends in an upright manner from the terminal members. The terminal members supporting the magnetoresistive element are disposed within a housing. The magnetoresistive element is loosely received within a depression formed in the housing.

With this known throttle control device, substantially the entire magnetoresistive element including the sensing section extends in an upright manner from the terminal members and is positioned within the depression of the housing. Therefore, the position of the magnetoresistive element tends to become unstable. For example, the sensing section of the magnetoresistive element may vibrate due to external vibrations, such as vibrations of the engine and vibrations of the vehicle body that may be caused during traveling of the vehicle. When the sensing section vibrates, the sensing section may move from a proper position determined relative to the magnets. As a result, output characteristics of the magnetoresistive element may be degraded.

Therefore, there is a need in the art for a rotational angle sensor that can prevent or minimize degradation of the output characteristics. Also, there is a need in the art for a throttle device having such a rotational angle sensor.

SUMMARY OF THE INVENTION

A rotational angle sensor has a magnetic detection device. The magnetic detection device includes a sensing section that can detect a change of a magnetic field, which may include a change in intensity of the magnetic field and a change in direction of the magnetic field. The magnetic field may be produced by at least two magnets attached to a rotary member. A housing member is molded integrally with the magnetic detection device and a support member. The support member may serves as a protective member for protecting at least the sensing section of the magnetic detection device or may serve as a positioning member that enables at least the sensing section to be positioned relative to the positioning member.

DETAILED DESCRIPTION OF THE INVENTION

Figure 1:
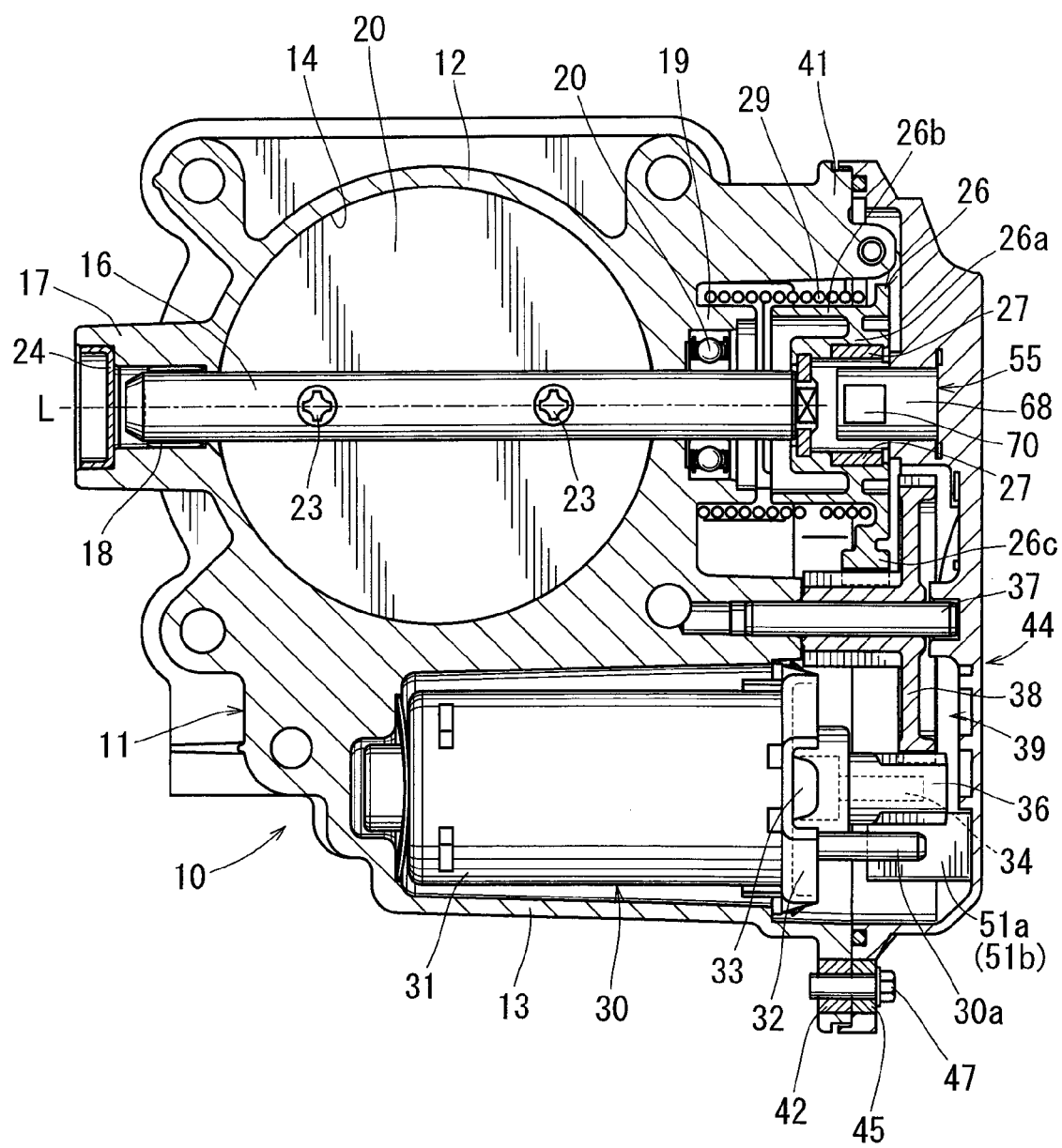
FIG. 1 is a cross-sectional view of a throttle device according to an embodiment of the present invention.

Each of the additional features and teachings disclosed above and below may be utilized separately or in conjunction with other features and teachings to provide improved rotational angle sensors and throttle devices having such rotational angle sensors. Representative examples of the present invention, which utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a rotational angle sensor has a magnetic detection device. The magnetic detection device includes a sensing section that can detect a change of a magnetic field produced by at least two magnets attached to a rotary member. A protective member can protect at least the sensing section of the magnetic detection device. A housing member is molded integrally with the magnetic detection device and the protective member by an insertion molding process.

The molding pressure is applied during the insertion molding process of the housing member. In addition, the potential stress may be produced due to contraction of the resin after the molding process. However, the molding pressure or the potential stress may not cause substantial influence to the sensing section of the magnetic detection device. As a result, it is possible to prevent or minimize the potential degradation of the output characteristics of the magnetic detection device.

The protective member may be made of a first resin material having a first melting point. The housing member may be made of a second resin material having a second melting point. The first melting point is higher than the second melting point. Therefore, the protective member may not be deformed or melted by heat during the molding process of the housing member. As a result, it is possible to reliably protect the sensing section of the magnetic detection device.

A part of the housing member, within which the sensing section of the magnetic detection device is disposed, may have a substantially uniform thickness. Therefore, it is possible to reduce or minimize the potential unbalance of the molding pressure that may be applied to the sensing section of the magnetic detection device during the insertion molding process. It is also possible to reduce of minimize the potential unbalance of the stress that may be produced due to contraction of the resin after the molding process.

The magnetic detection device may include a plurality of connecting terminals connected to corresponding terminals of a connector.

The housing member may be integrated with a stationary member by an insertion molding process. The stationary member does not cover a portion having a predetermined configuration of the housing member. Therefore, the molding pressure and the potential stress that may be produced due to contraction of the resin may not cause substantial influence to the portion of the housing member having the predetermined configuration.

Preferably, the sensing section is positioned within the portion of the housing member having the predetermined configuration. With this arrangement, the molding pressure or the potential stress due to contraction of the resin may not influence the sensing section. Therefore, it is possible to reliably prevent degradation of the output characteristics of the magnetic detection device.

In another embodiment, a throttle device has a throttle body defining an intake air channel. A throttle valve is operable to open and close the intake air channel for controlling an amount of an intake air flowing through the intake air channel. A rotary member is coupled to the throttle valve. At least two magnets are attached to the rotary member. The rotational angle sensor described in the above embodiment is attached to the throttle body for detecting a rotational angle of the throttle valve. Therefore, it is possible to realize a throttle device having a rotational angle sensor that can prevent or minimize the potential degradation of the output characteristics of the magnetic detection device.

The throttle device may further include a drive mechanism for rotatably driving the throttle valve. The throttle body includes a cover member for covering the drive mechanism. The housing member is integrated with the cover member by an insertion molding process. The cover member does not cover a portion having a predetermined configuration. Therefore, the molding pressure and the potential stress may not cause substantial influence to the portion of the housing member having the predetermined configuration.

The throttle device may further include an electrically driven actuator coupled to the drive mechanism and a plurality of terminals for electrically connecting to the actuator. The terminals are also integrated with the cover member by the insertion molding process. Therefore, the cover member may have the terminals integrated therewith in addition to the housing member of the rotational angler sensor.

The cover member may be joined to the throttle body by adhesion or welding. With this technique, the cover member can be easily attached to the throttle body.

In a further embodiment, a rotational angle sensor includes a positioning member that enables at least the sensing section of the magnetic detection device to be positioned relative to the positioning member. The housing member is molded integrally with the magnetic detection device and the positioning member by an insertion molding process.

With this arrangement, the positioning member integrated with the housing member can reliably hold the sensing section in position. Therefore, it is possible to reliably prevent or minimize the potential degradation of the output characteristics of the magnetic detection device, which may be caused when the sensing section vibrates or moves due to externally applied vibrations.

The sensing section may have at least one projection and the positioning member may position the at least one projection relative to the positioning member. With this arrangement, the sensing section can be further reliably held in position.

The positioning member may serve also as a protective member that can protect at least the sensing section of the magnetic detection device.

Preferably, the positioning member can position the at least the sensing section of the magnetic detection device within a central portion of the positioning member. With this arrangement, the sensing section can be further reliably protected.

The positioning member may include a plurality of positioning segments and may enclose at least the sensing section of the magnetic detection device. With this arrangement, the positioning member can be easily positioned to enclose the sensing section.

The positioning member may include a positioning portion that can be positioned relative to a molding die used for molding the housing member. With this arrangement, the positioning member can be positioned accurately at an aimed position relative to the housing member.

Preferably, the positioning member can simultaneously position sensing sections of a plurality of magnetic detection devices. Therefore, the sensing sections can be easily reliably positioned relative to the positioning member.

The housing member may be integrated with a stationary member by an insertion molding process, while the stationary member does not cover a portion surrounding the sensing section of the magnetic detection device.

In a still further embodiment, a throttle device has a rotational angle sensor that includes the positioning member. Therefore, it is possible to realize a throttle device having a rotational angle sensor that can prevent or minimize the potential degradation of the output characteristics of the magnetic detection device.

The throttle control device may further include a drive mechanism for rotatably driving the throttle valve. A detachable cover member may cover the drive mechanism. With this construction, cover members having the same configuration can be used for different types of throttle bodies.

In a further embodiment, a sensor has a magnetic detection device having a sensing section that can detect a change of a magnetic field. A first member made of a first resin material is engaged with at least the sensing section of the magnetic detection device. A second member made of a second resin material is molded integrally with the magnetic detection device and the first member, so that the magnetic detection device and the first member are embedded within the second member.

An embodiment of the present invention will now be described with reference to FIGS. 1 to 14. This embodiment relates to a rotational angle sensor that is used as a throttle sensor for detecting a rotational angle of a throttle valve of an electronically controlled throttle device. The throttle sensor may be also called "a throttle position sensor" or "an open angle sensor." For the purpose of explanation, the description will be first made to the throttle device and the description of the rotational angle sensor will follow.

As shown in FIG. 1, a throttle device 10 has a resin throttle body 11. The throttle body 11 includes a bore wall portion 12 and a motor housing portion, which are formed integrally with each other. A substantially hollow cylindrical bore 14 is defined within the bore wall portion 12 and extends therethrough in a direction perpendicular to the sheet of FIG. 1. The bore 14 may be called "an intake air channel." Although not shown in the drawings, an air cleaner is connected to the upstream side of the bore wall portion 12 and an intake manifold is connected to the downstream side of the bore wall portion 12.

A metal throttle shaft 16 is disposed within the bore wall portion 12 and extends across the bore 14 in a diametrical direction thereof. Cylindrical support portions 17 and 18 are formed integrally with the bore wall portion 12. The support portion 17 rotatably supports a first end (left end as viewed in FIG. 1) of the throttle shaft 16 via a bearing 18. The support portion 18 rotatably supports a second end (right end as viewed in FIG. 1) of the throttle shaft 16 via a bearing 19. A disk-like throttle valve 22 is secured to the throttle shaft 16 by screws 23. The throttle valve 22 is configured as a butterfly valve and can open and close the bore 14 as it rotates about a rotational axis. More specifically, a drive motor 30 rotatably drives the throttle valve 22 for opening and closing the bore 14, so that an amount of intake air flowing through the bore 14 can be controlled.

A plug 24 is sealingly fitted into an open end of the support portion 17 that is positioned on the left side as viewed in FIG. 1. The second end (right end as viewed in FIG. 1) of the throttle shaft 16 extends through and beyond the support portion 19. A throttle gear 26 that may be made of resin is secured to a part of the second end of the throttle shaft 16, which part extends rightward from the support portion 19, so that the throttle gear 26 is prevented from rotating relative to the throttle shaft 16. The throttle gear 26 includes a central cylindrical inner sleeve portion 26a, a cylindrical outer sleeve portion 26b positioned about the inner sleeve portion 26a, and a gear portion 26c positioned about the outer sleeve portion 26b. The inner sleeve portion 26a, the outer sleeve portion 26b and the gear portion 26c are formed integrally with each other. A pair of permanent magnets 27 and a pair of yokes (not shown) are disposed on the inner circumferential portion of the inner sleeve portion 26a of the throttle gear 26 and are integrated therewith by an insertion molding process. The magnets 27 oppose to each other in a diametrical direction of the throttle gear 26. The yokes jointly form a ring, so that the magnets 27 are positioned on the inner side of the ring. For example, the magnets 27 may be made of a ferrite magnet material. The yokes may be made of a magnetic material. The magnets 27 are magnetized such that the magnetic lines or the magnetic field lines produced between the magnets 27 extend parallel to each other. Therefore, the magnetic field lines extend substantially parallel to each other across the hollow space defined within the inner sleeve portion 26a.

A back spring 29 is a coil spring interleaved between the throttle body 11 and the throttle gear 26 and biases the throttle gear 26 in a direction corresponding to a closing direction of the throttle valve 22.

The motor housing portion 13 of the throttle body 11 is configured as a hollow cylindrical configuration with an axis extending parallel to a rotational axis L of the throttle shaft 16. The left end as viewed in FIG. 1 of the motor housing portion 13 is closed, while the right of the motor housing portion 13 is opened. The drive motor 30 that may be a DC motor is received within the motor housing portion 13. The drive motor 30 has a motor casing 31 (defining an outer casing of the drive motor 30) with a mount flange 32 that is secured to an end face on the side of the open end of the motor housing portion 13 by means of screws 33. In addition, the drive motor 30 has an output rotational shaft 34 protruding outward from the open end (right side end as viewed in FIG. 1) of the motor housing portion 13. A motor pinion 36 that may be made of resin is fixedly attached to the output rotational shaft 34. The drive motor 30 may be called "an electrically driven actuator."

A countershaft 37 is mounted on the throttle body 11. The countershaft 37 is disposed on the side opposing to a drive mechanism or a reduction gear mechanism 39 including the throttle gear 26 and the motor pinion 36 and is positioned between the throttle shaft 16 and the output rotational shaft 34 of the drive motor 30. A counter gear 38 that may be made of resin is rotatably supported by the countershaft 37. The counter gear 38 includes a large diameter gear portion and a small diameter gear portion, which are disposed on the same axis and engage the motor pinion 36 and the gear portion 26c of the throttle gear 26, respectively. The throttle gear 26, the motor pinion 36 and the counter gear 38 constitute the reduction gear mechanism 39 for reducing the rotational speed of the drive motor 30 by a predetermined ratio.

The drive motor 30 is driven based on a control signal outputted from an electronic control unit (ECU) (not shown), so that the rotation of the drive motor 30 is transmitted to the throttle shaft 16 via the motor pinion 36, the counter gear 38 and the throttle gear 26 and is further transmitted to the throttle valve 22. Therefore, the throttle valve 22 rotates within the bore 14 to open or close the bore 14, so that the amount of intake air flowing through the bore 14 can be controlled.

On the side opposing to the reduction gear mechanism 39, an annular cover mount wall 41 is formed integrally with the outer peripheral portion of the throttle body 11 and surrounds the reduction gear mechanism 39. A plurality of metal nuts 42 are integrated with the cover mount wall 41 by an insertion molding process and are arranged at predetermined intervals along the circumferential direction of the cover mount wall 41. In this embodiment, six nuts 42 are provided although only one nut 42 is shown in the drawings.

A cover member 44 made of resin serves to close the open end of the cover mount wall 41. A plurality of cylindrical sleeve members 45 are integrated with the outer peripheral portion of the cover member 44 by an insertion molding process. The sleeve members 45 are arranged at predetermined intervals along the circumferential direction of the cover member 44 in alignment with the respective nuts 42. Threaded shanks of bolts 47 are inserted into the sleeve members 45 and are engaged with the corresponding threaded holes of the nuts 42, so that the cover member 44 can be detachably mounted to the throttle body 11. In this way, the bolts 47 serve as fastening members for detachably attaching the cover member 44 to the throttle body 11.

Figure 2:
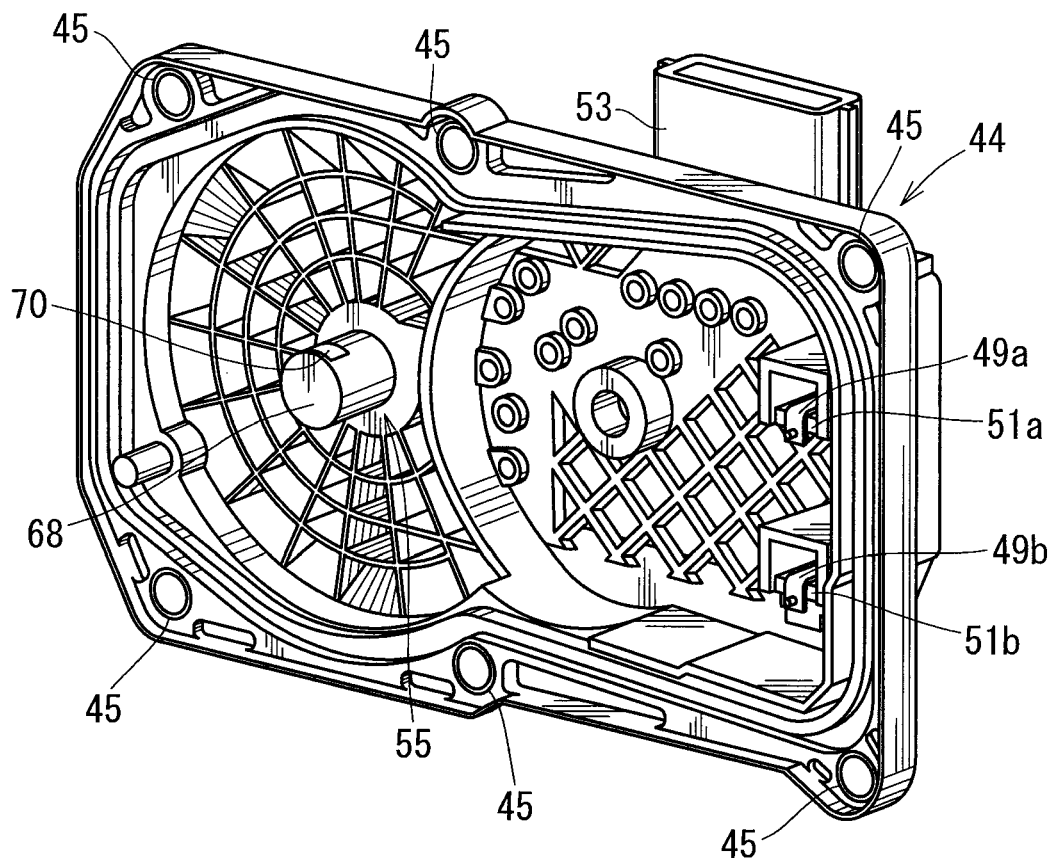
FIG. 2 is a perspective view as viewed from the backside of a cover member of the throttle device.

As shown in FIG. 2, a rotational angle sensor 55 is integrated with a back side portion of the cover member 44 by an insertion molding process. The rotational angle sensor 55 has a housing member 68. The front end (left end as viewed in FIG. 1) of the housing member 68 extends into the inner sleeve portion 26a of the throttle gear 26, which has the permanent magnets 27 and the yokes integrated therewith, such that the front end of the housing member 68 extends coaxial with the inner sleeve portion 26a. A clearance is provided between the front end of the housing member 68 and the inner circumference of the sleeve portion 26a, so that the front end of the housing member 68 does not contact the inner circumference of inner sleeve portion 26a.

As shown in FIG. 2, first and second power supply terminals 49a and 49b as well as first and second relay connectors 51a and 51b are integrated with the cover member 44 by an insertion molding process. The first and second power supply terminals 49a and 49b are used for supplying a power to the drive motor 30 (see FIG. 1). The first relay connector 51a is connected to one end (inner end) of the first power supply terminal 49a and is in contact with one of two motor terminals 30a (only one motor terminal 30a is shown in the drawings) so as to be electrically connected thereto. The second relay connector 51b is connected to one end of the second power supply terminal 49b and is in contact with the other of the two motor terminals 30a so as to be electrically connected thereto. A connector 53 has a connector body formed integrally with the outer side portion of the cover member 44. The outer ends (upper ends as viewed in FIG. 4) of the first and second power supply terminals 49a and 49b as well as outer ends (upper ends as viewed in FIGS. 3 and 4) of sensor terminals 74a, 74b, 74c and 74d of the rotational angle sensor 55 extend into the connector body and are arranged in rows therewithin.

An external connector (not shown) can be connected to the connector 53 of the cover member 44. The external connector has terminal pins that can contact the outer ends of the first and second power supply terminals 49a and 49b and the sensor terminals 74a, 74b, 74c and 74d for electrical connection therewith. Therefore, detection signals from the rotational angle sensor 55 can be outputted to the electronic control unit (ECU) via the external connector. Also, the ECU can output control signals to the drive motor 30 via the external connector.

Figure 8:
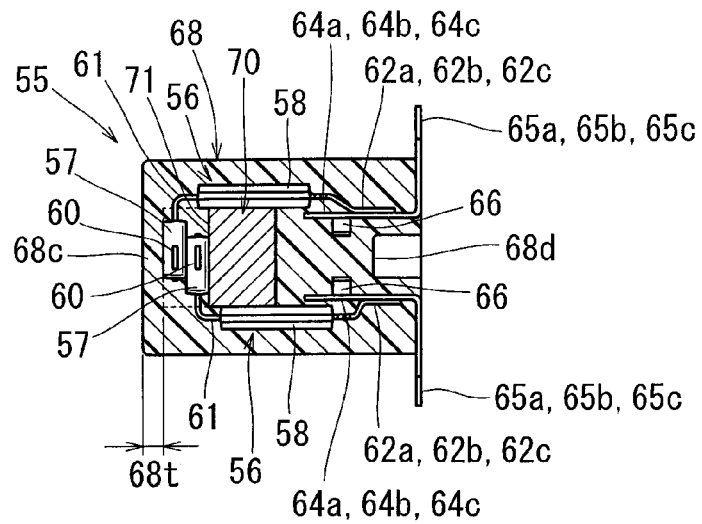
FIG. 8 is a cross-sectional view taken along line VIII-VIII in FIG. 5.
Figure 9:
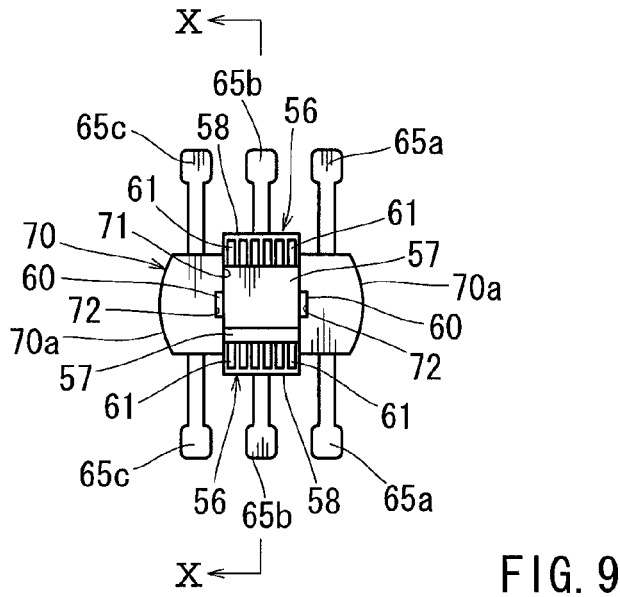
FIG. 9 is a front view showing the relating between magnetic detection devices and a support member of the rotational angle sensor.
Figure 11:
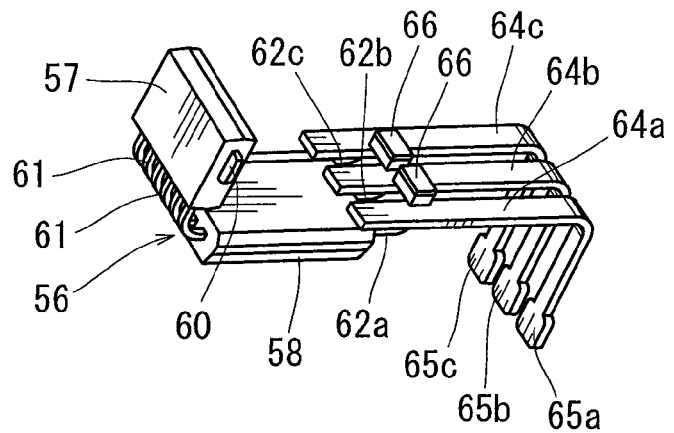
FIG. 11 is a perspective view of one of the magnetic detection devices.

The rotational angle sensor 55 will now be described with reference to FIGS. 5 to 8. As shown in FIG. 8, the rotational angle sensor 55 includes two magnetic detection devices 56. As shown in FIG. 11, each of the magnetic detection devices 56 is a sensor IC and includes a sensing section 57 and a computing section 58 connected in series with each other. The sensing section 57 includes a rectangular plate-like resin body and a magnetoresistive element (called a MR element) embedded within the resin body. The MR element can detect a direction of the magnetic field that is produced by the pair of permanent magnets 27 attached to the throttle gear 26 (see FIG. 1). The MR element can then output a detection signal representing the direction of the magnetic field to the calculating section 58. Metal projections 60 extend outward from opposite end faces of the resin body and are positioned symmetrically with each other. The projections 60 are adapted to be engaged by a support member 70 that is configured to be held by a molding die (not shown) used for molding the magnetic detection device 56. The details of the support member 70 will be explained later.

As shown in FIG. 11, the computing section 58 has a rectangular plate-like resin body and a semiconductor integrated circuit (IC) embedded within the resin body. The computing section 58 serves to calculate the rotational angle of the throttle gear 26 (see FIG. 1) based on the detection signal outputted from the sensing section 57. The computing section 58 is programmed such that it can output a linear voltage signal corresponding to the rotational angle of the throttle gear 26. In addition, the resin body of the computing section 58 is elongated along a direction of the serial connection with the sensing section 57. The sensing section 57 and the computing section 58 are connected to each other via a plurality of conductive wires 61. In this embodiment, six conductive wires 61 are used. The computing section 58 has three sensor terminals 62a, 62b and 62c that extend parallel to each other from the end face of the resin body on the side opposite to the sensing section 57. The sensor terminal 62a serves as a power source terminal (input terminal), the sensor terminal 62b serves as a ground terminal, and the sensor terminal 62c serves as a signal output terminal.

The sensing section 57 is tilted at an angle of about 90° toward one side of the computing section 58 by bending the conductive wires 61. One end of a relay terminal 64a is connected to a side surface of the sensor terminal 62a at a position on the tilting side of the sensing section 57. Similarly, one end of a relay terminal 64b is connected to a side surface of the sensor terminal 62b at a position on the tilting side of the sensing section 57; and one end of a relay terminal 64c is connected to a side surface of the sensor terminal 62c at a position on the tilting side of the sensing section 57. Each of the relay terminals 64a, 64b and 64c is made of electrically conductive material having a high mechanical strength. Noise-preventing chip capacitors 66 are connected between the relay terminal 64a (power source terminal) and the relay terminal 64b (ground terminal) positioned adjacent thereto and between the relay terminal 64b and the relay terminal 64c (signal output terminal) positioned adjacent thereto. Opposite ends of the relay terminals 64a, 64b and 64c are bent toward the side opposite to the tilting side of the sensing section 57 at an angle of about 90° to respectively form connecting terminals 65a, 65b and 65c.

Figure 10:
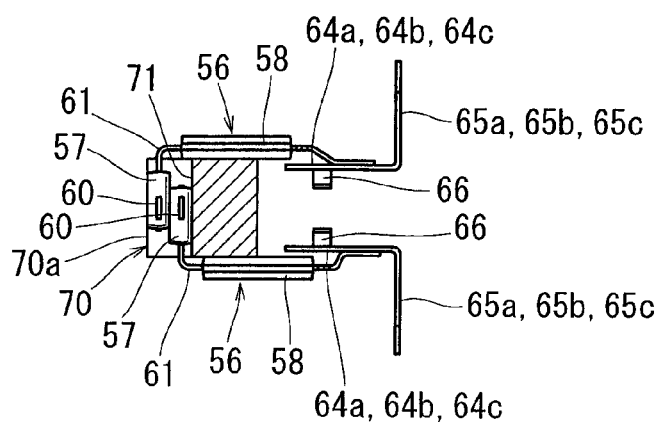
FIG. 10 is a cross-sectional view taken along line X-X in FIG. 9.

Two magnetic detection devices 56 each including the relay terminals 64a, 64b and 64c and the chip capacitors 55 (see FIG. 11) are positioned such that (a) the computing sections 58 are positioned in parallel to each other with respect to the vertical direction, (b) the sensing sections 57 are laid with each other in the forward and rearward directions, and (c) the connecting terminals 65a, 65b and 65c of one of the magnetic detection devices 56 are oriented opposite to the directions of the connecting terminals 65a, 65b and 65c of the other of the magnetic detection devices 56, respectively (see FIG. 10). The lengths of the sensor terminals 62a, 62b and 62c and/or the lengths of the relay terminals 64a, 64b and 64c of each magnetic detection device 56 are determined such that the connecting terminals 65a, 65b and 65c of one of the magnetic detection devices 56 extend within substantially the same plane as the connecting terminals 65a, 65b and 65c of the other of the magnetic detection devices 56. After the magnetic detection devices 56 have been positioned in this way, the magnetic detection devices 56 are integrated with the cylindrical housing member 68 by an insertion molding process. However, before performing this molding process, the support member 70 is assembled or engaged with the magnetic detection devices 56 for positioning as described above.

For the purpose of explanation of the rotational angle sensor 55, the side of the sensing sections 57 will be called "a front side" and the side of the relay terminals 64a, 64b and 64c will be called "a rear side." Therefore, the sensing section 57 of one of the magnetic detection devices 56 positioned on the front side will be called "a front side sensing section 57", and the sensing section 57 of the other of the magnetic detection devices 56 positioned on the rear side will be called "a rear side sensing section 57." The side of the computing section 58 connected to the front side sensing section 57 will be called "an upper side", and the side of the computing section 58 connected to the rear side sensing section 57 will be called "a lower side."

Figure 12:
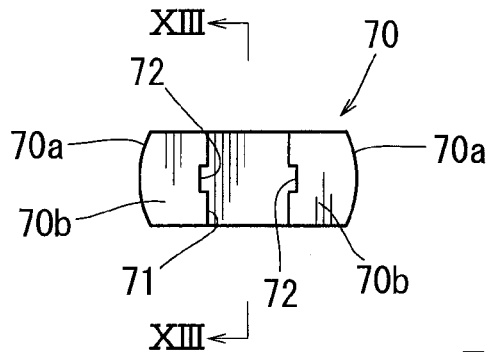
FIG. 12 is a front view of the support member.
Figure 13:
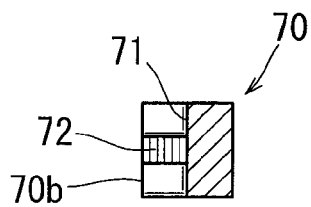
FIG. 13 is a cross-sectional view taken along line XIII-XIII in FIG. 12.
Figure 14:
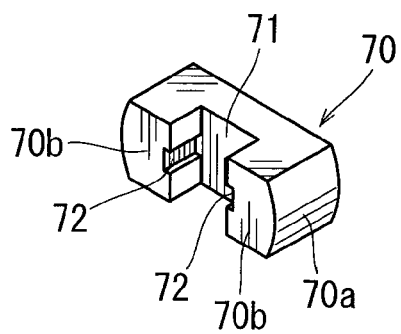
FIG. 14 is a perspective view of the support member.
Figure 15:
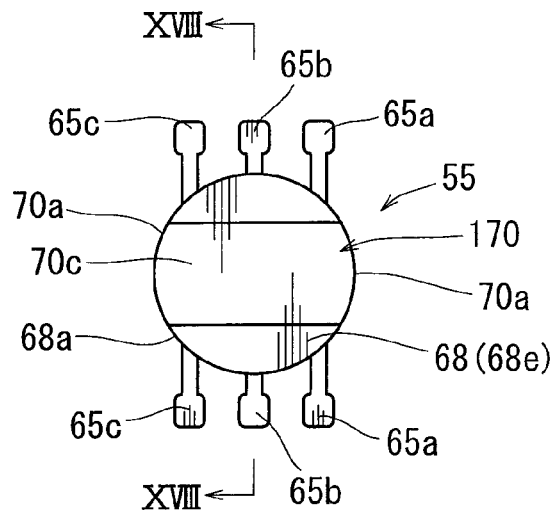
FIG. 15 is a front view of a rotational angle sensor of a throttle device according to another embodiment of the present invention.
Figure 16:
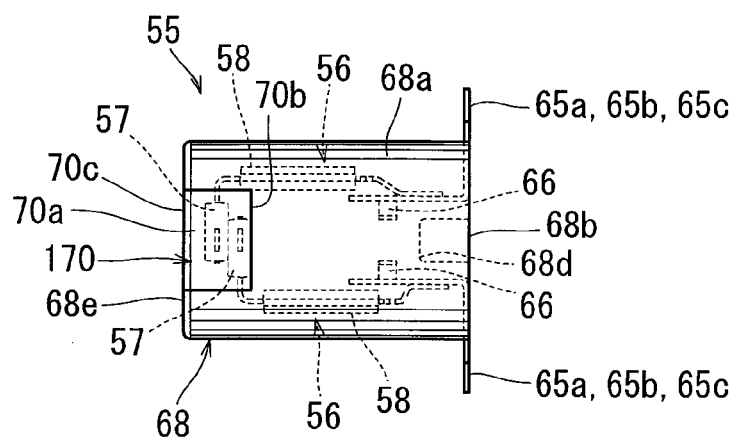
FIG. 16 is a side view of the rotational angle sensor.
Figure 17:
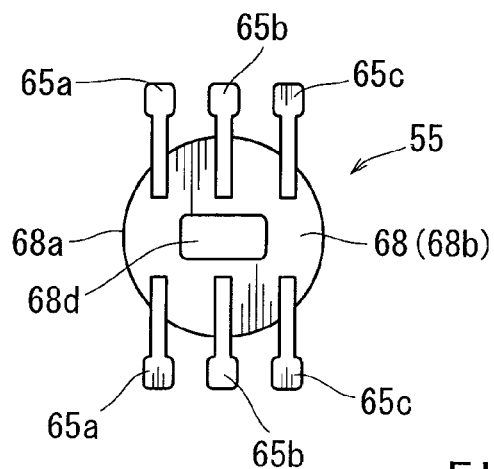
FIG. 17 is a rear view of the rotational angle sensor.

Referring to FIGS. 12 to 14, the support member 70 is made of resin and has a channel-like configuration defining a positioning recess 71. In the assembled state, the support member 70 is positioned between the computing sections 58 of the magnetic detection devices 56. The configuration of the positioning recess 71 is determined such that the sensing sections 57 of the magnetic detection devices 56 are substantially closely fitted within the positioning recess 71 (see FIGS. 9 and 10). A pair of engaging recesses 72 are formed in opposing inner walls of the positioning recess 71 and are engageable with the projections 60 extending from opposite end faces of the sensing sections 57 of the magnetic detection devices 56 (see FIG. 9).

Therefore, the support member 70 is set between the magnetic detection devices 56 such that (1) the support member 70 is positioned between the computing sections 58 of the magnetic detection devices 56, (2) the sensing sections 57 are substantially closely fitted into the positioning recess 71, and (3) the projections 60 of the sensing sections 57 engage the engaging recesses 72. As a result, the support member 70 can position and support the sensing sections 57. The resin material of the support member 70 is chosen to have a melting point that is higher than a melting point of the resin material of the housing member 68. For example, the resin material of the support member 70 may be polybutylene terephtalate (PBT), and the resin material of the housing member 68 may be epoxy resin. The resin material of the cover member 44 may be polybutylene terephtalate (PBT) or polyphenylene sulfide (PPS)

Right and left side surfaces 70a of the support member 70 (see FIG. 12) are configured as arc-shaped curved surfaces, so that the right and left side surfaces 70a extend in continuous with a cylindrical outer side surface 68a of the housing member 68 (see FIGS. 5 to 8). In addition, end faces 70b (see FIGS. 12 to 14) on opposite sides of the opening of the positioning recess 71 of the support member 70 are configured to extend substantially flush with the front face of the front side sensing section 57 that is positioned on the front side of the rear side sensing section 57 (see FIG. 10).

The housing member 68 is molded with the sub-assembly of the magnetic detection devices 56 and the support member 70 by an insertion molding process. For performing this process, the subassembly is inserted into a molding die (not shown) used for molding the housing member 68 and is positioned within the molding die. Thereafter, a resin is injected into the molding die, so that the sub-assembly is integrated with the housing member 68 as the housing member 68 is molded (see FIGS. 5 to 8). The side surfaces 70a of the support member 70 can serve as reference surfaces for positioning the sub-assembly within the molding die. With the housing member 68 molded as described above, the side surfaces 70a of the support member 70 are exposed to the outside and extend in continuous with the outer side surface 68a of the housing member 68. In addition, the connecting terminals 65a, 65b and 65c of the magnetic detection devices 56 are exposed to the outside from a rear surface 68b of the housing member 68. The other parts of the support member 70 and the magnetic detection devices 56 are embedded within the housing member 68. A front side resin part 68c of the housing member 68 has a thickness 68t at a position facing to the surface of the front side sensing section 57. The thickness 68*t* is substantially uniform along the length of the front side sensing section 57 (see FIG. 8). Further, a depression 68*d* is formed in the central portion of the rear surface 68*b* of the housing member 68 (see FIGS. 7 and 8).

After the housing member 68 has been molded as described above, two branched connecting ends of the sensor terminal 74*a* that serves as a power source terminal (see FIG. 4) are respectively connected to the connecting terminals 65*a* of the two magnetic detection devices 56. Similarly, two branched connecting ends of the sensor terminal 74*b* that serves as a ground terminal (see FIG. 4) are respectively connected to the connecting terminals 65*b* of the two magnetic detection devices 56. A connecting end of the sensor terminal 74*c* that serves as a signal output terminal is connected to the connecting terminal 65*c* of one of the magnetic detection devices 56. A connecting end of the sensor terminal 74*d* that also serves as a signal output terminal is connected to the connecting terminal 65*c* of the other of the magnetic detection devices 56.

The rotational angle sensor 55 (see FIG. 3) is thus completed by connecting the sensor terminals 74*a*, 74*b*, 74*c* and 74*d* as described above. The rotational angle sensor 55, the motor terminals 49*a* and 49*b* (see FIG. 4), the relay connectors 51*a* and 51*b*, and the sleeve members 45 are then inserted into a molding die used for molding the cover member 44, so that they are integrated with the cover member 44 as the cover member 44 is molded (insertion molding process) (see FIG. 2). More specifically, the rear portion of the rotational angle sensor 55 including the connecting terminals 65*a*, 65*b* and 65*c*, and the sensor terminals 74*a*, 74*b*, 74*c* and 74*d* are embedded within the cover member 44. Also, the motor terminals 49*a* and 49*b* are embedded within the cover member 44. The front portion of the housing member 68 including the support member 70 of the rotational angle sensor 55 is exposed to the outside from the cover member 44 and extends from the rear side of the cover member 44.

Figure 3:
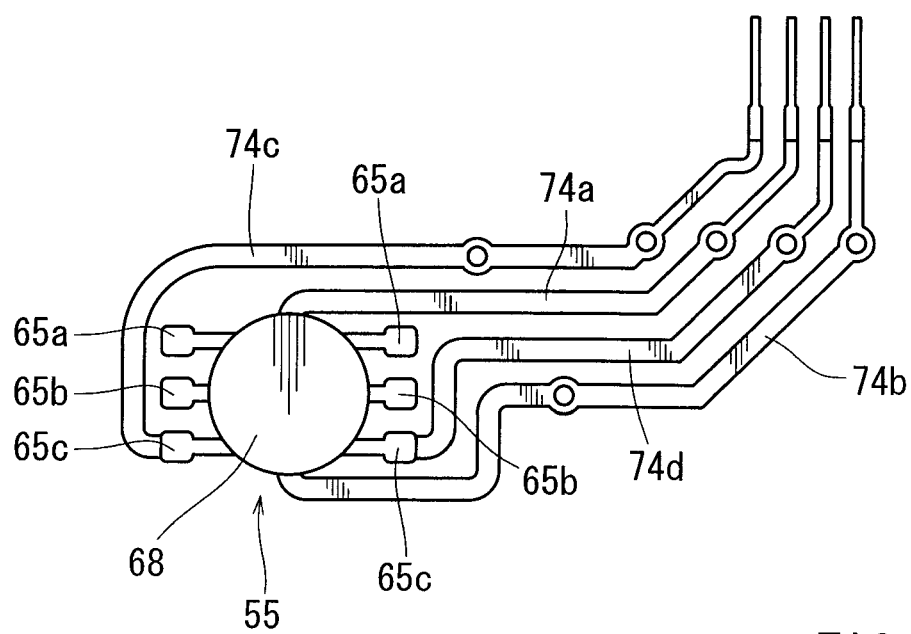
FIG. 3 is a front view of a rotational angle sensor of the throttle device and showing the state where sensor terminals are connected to the sensor.
Figure 4:
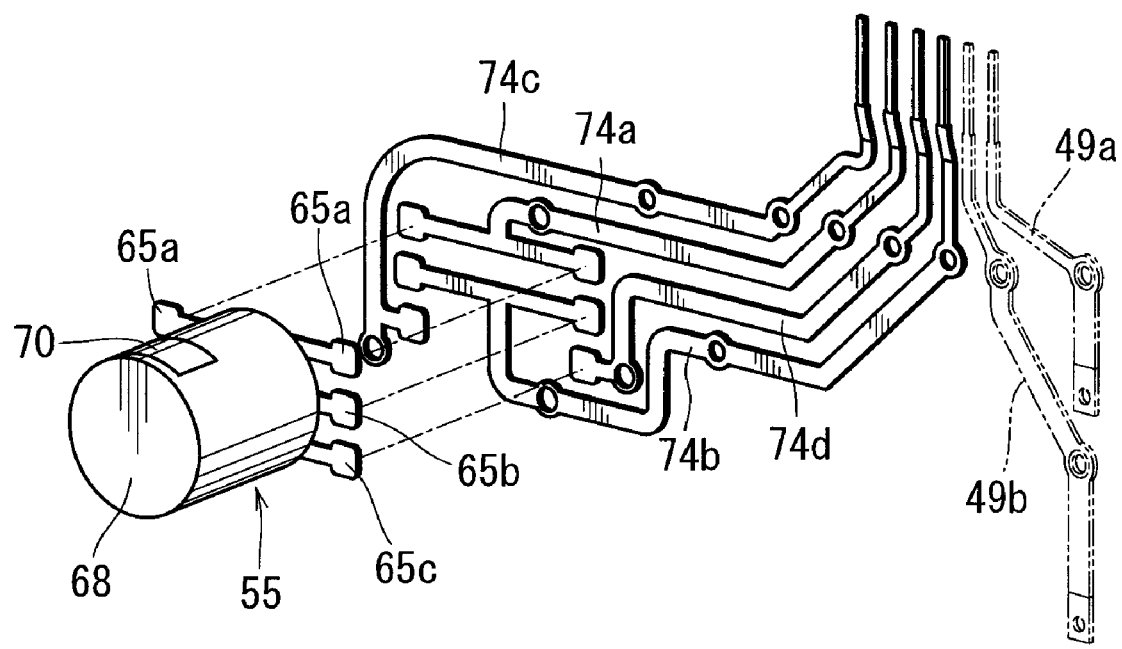
FIG. 4 is a perspective view of the rotational angle sensor and showing the state where the sensor terminals are not connected to the sensor.
Figure 5:
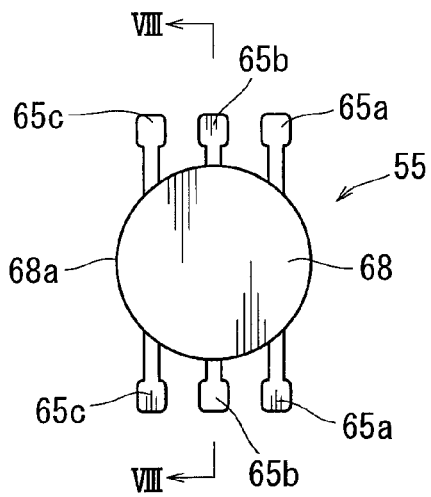
FIG. 5 is a front view of the rotational angle sensor.
Figure 6:
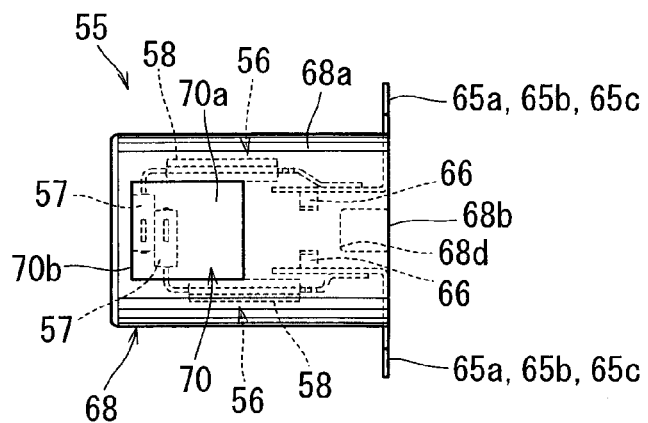
FIG. 6 is a side view of the rotational angle sensor.
Figure 7:
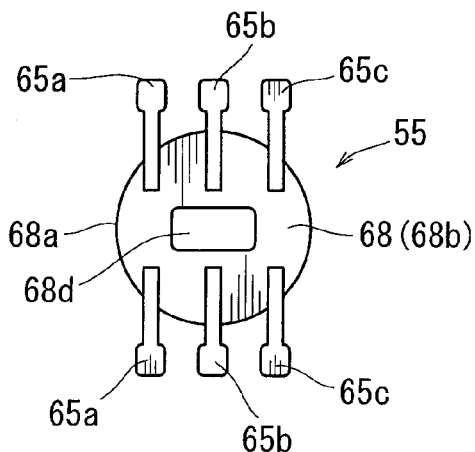
FIG. 7 is a rear view of the rotational angle sensor.

Further, the outer ends (upper ends as viewed in FIG. 4) of the sensor terminals 74*a*, 74*b*, 74*c* and 74*d* and the motor terminals 49*a* and 49*b* protrude into a space defined within the connector portion 53 of the cover member 44 (see FIG. 2) and are arranged in rows within the space. As shown in FIG. 3, the relay connectors 51*a* and 51*b* are embedded within the cover member 44 such that they partly extend to the outside from the rear side of the cover member 44, so that the motor terminals 30*a* can be electrically connected to the respective relay connectors 51*a* and 51*b*. The sleeve members 45 are embedded within the cover member 44 for allowing insertion of the bolts 47.

As the cover member 44 molded as described above is joined to the throttle body 11 by the bolts 47, the relay connectors 51*a* and 51*b* contact the respective motor terminals 30*a* of the drive motor 30, so that the relay connectors 51*a* and 51*b* can be electrically connected to the respective motor terminals 30*a*. In addition, the front portion of the housing member 68 of the rotational sensor 55 is inserted into the inner sleeve portion 26*a* of the throttle gear 26. In this state, the front portion of the housing member 68 does not contact the inner circumference of the inner sleeve portion 26*a* and the axis of the housing member 68 is positioned on the same axis (i.e., the rotational axis L) as the inner sleeve portion 26*a*. As described previously, the permanent magnets 27 and the yokes are attached to the inner circumference of the inner sleeve portion 26*a*. Further, the sensing sections 57 of the magnetic detection devices 56 are positioned substantially on the axis L of the inner sleeve portion 26*a* and between the permanent magnets 27. More specifically, the rectangular faces of the sensing sections 57 are positioned substantially perpendicular to the rotational axis L. With this arrangement, the sensing sections 57 can detect the direction of the magnetic field produced between the permanent magnets 27.

According to the rotational sensor 55 of this embodiment, the magnetic detection devices 56 and the support member 70 are integrated with the housing member 68 by the insertion molding process. As described above, the magnetic detection devices 56 serve to detect the rotational angle of the throttle gear 26 based on the direction of the magnetic field that is produced between the permanent magnets 27 attached to the throttle gear 26. The support member 70 serves to protect the sensing sections 57 of the magnetic detection devices 56. The molding pressure may be applied during the insertion molding process of the housing member 68. In addition, the potential stress may be produced due to contraction of the resin after the molding process. However, the molding pressure or the potential stress may not cause substantial influence to the sensing sections 57 of the magnetic detection devices 56. As a result, it is possible to prevent or minimize the potential degradation of the output characteristics of the magnetic detection devices 56.

The use of the support member 70 can reduce the resin material of the housing member 68 by an amount corresponding to the volume of the support member 70. In other word, it is possible to reduce the amount of a costly resin, such as an epoxy resin that may be used for the housing member 68. Therefore, it is possible to reduce the manufacturing cost.

In addition, the use of the support member 70 can prolong in a manner like a labyrinth the potential path of entrance of the ambient moisture from the outside of the housing 68 to the sensing sections 57 of the magnetic detection devices 56. Therefore, it is possible to prevent or minimize the moisture entering the sensing sections 57. Hence, it is possible to prevent the potential short-circuiting.

The sensing sections 57 of the magnetic detection devices 56 are positioned or held in position by the support member 70 that is integrated with the housing member 68. Therefore, it is possible to prevent or minimize the potential degradation of the output characteristics of the magnetic detection devices 56, because the sensing sections 57 may not vibrate or move by externally applied vibrations.

The resin material of the support member 70 has a melting point that is higher than a melting point of the resin material of the housing member 68. Therefore, the support member 70 may not be deformed or melted by the heat that is applied to the support member 70 during the insertion molding process of the housing member 68. As a result, the sensing sections 57 of the magnetic detection devices 57 can be further reliably protected.

The projections 60 extending from opposite end faces of the sensing sections 57 of the magnetic detection devices 56 engage the engaging recesses 72 of the support member 70. Therefore, the sensing sections 57 can be further accurately positioned at an aimed position relative to the support member 70 and eventually relative to the housing member 68.

Because the sensing sections 57 of the magnetic detection devices 56 are positioned simultaneously by the support member 70, the sensing sections 57 can be easily positioned.

The thickness 68*t* of the resin part 68*c*, within which the sensing sections 57 of the magnetic detection devices 56 are embed, is set to be substantially uniform (see FIG. 8). More specifically, the thickness 68*t* of the resin part 68*c* of the housing member 68 at a position facing to the surface of the front side sensing section 57 of one of the magnetic detection devices 56 is substantially uniform along the length of the front side sensing section 57. Therefore, it is possible to reduce or minimize the potential unbalance of the molding pressure that may be applied to the sensing sections 57 of the magnetic detection devices 56 during the insertion molding process. It is also possible to reduce of minimize the potential unbalance of the stress that may be produced due to contraction of the resin after the molding process.

The sensor terminals 74a, 74b, 74c and 74d are connected to the corresponding connecting terminals 65a, 65b and 65c of the magnetic detection devices 56. Therefore, the rotational angle sensor 55 having the sensor terminals 74a, 74b, 74c and 74d can be presented.

The housing member 68 is integrated with the cover member 44 by the insertion molding process, while the front portion of the housing member 68 including the support portion 70 is not embedded within the cover member 44. In other words, the housing member 68 has a region, which has a predetermined configuration and is not covered by the cover member 44. Therefore, the molding pressure applied during the insertion molding process of the cover member 44 and the potential stress that may be produced due to contraction of the resin after the molding process may not cause substantial influence to the above region of the housing member 68.

In addition, the aforementioned region of the housing member 68 having a predetermined configuration includes a portion surrounding the sensing sections 57 of the magnetic detection devices 56. Therefore, the molding pressure applied during the insertion molding process of the cover member 44 and the potential stress that may be produced due to contraction of the resin after the molding process may not cause substantial influence to the portion of the housing member 68 surrounding the sensing sections 57. As a result, the potential degradation of the output characteristics of the magnetic detection devices 56 can be further reliably prevented or minimized.

The rotational angle sensor 55 includes two magnetic detection devices 56 for the fail-safe purpose. Thus, even if one of the magnetic detection devices 56 has been accidentally failed, the other of the magnetic detection devices 56 can ensure the detection function of the rotational angle sensor 55. Therefore, it is possible to reliably prevent the accidental non-detection of the rotational angle.

In addition to the throttle gear 26 disposed on the side of the throttle valve 22, the throttle device 10 (see FIG. 1) has the rotational angle sensor 55 disposed on the side of the throttle body 11 for detecting the opening of the throttle valve 22. Therefore, the throttle device 10 has the rotational angle sensor 55 that can prevent or minimize the potential degradation of the output characteristics of the magnetic detection devices 56.

The motor terminals 49a and 49b, which serve to supply a power to the drive motor 30 for actuating the throttle valve 22, are integrated with the cover member 44 by the insertion molding process. Therefore, the cover member 44 has the motor terminals 49a and 49b integrated therewith in addition to the housing member 68 of the rotational sensor 55.

The sleeve members 45 are also integrated with the cover member 44 by the insertion molding process. The sleeve members 45 permit insertion of the bolts 47, so that the cover member 44 can be mounted to and removed from the throttle body 11 by tightening and releasing the bolts 47. Therefore, the cover member 44 has the sleeve members 45 integrated therewith in addition to the housing member 68 of the rotational sensor 55. In addition, because the cover member 44 can be removed from the throttle body 11, the cover member 44 can be used for different types of throttle bodies.

In the case that the cover member 44 is fastened to the throttle body 11 by means of the bolts 47 and the nuts 42 as in this embodiment, the throttle body 11 may be made of metal instead of resin. For example, the throttle body 11 may be an aluminum die-cast product. In such a case, the nuts 42 may be omitted. Alternatively, the cover member 44 can be attached to the throttle body 11 by means of clips or the like instead of the bolts 47 and the nuts 42.

In addition, in the case that both of the throttle body 11 and the cover member 44 are made of resin as in this embodiment, the cover member 44 can be fixedly attached to the throttle body 11 by means of adhesion (for example, by using an adhesive agent or an adhesive material) or by means of welding (for example, by laser-welding or hot-plate welding) instead of fastening of the bolts 47 with the nuts 42. The use of adhesion or welding enables to easily attach the cover member 44 to the throttle body 11. In particular, it is possible to attach the cover member 44 to the throttle body 11 with high accuracy with respect to the position. In addition, because the bolts 47, the nuts 42 and the sleeve members 45 are no longer necessary, it is possible to reduce the number of parts. Alternatively, it is possible to fixedly attach the cover member 44 to the throttle body 11 by heating and crimping portions of these members instead of adhesion or welding.

Further, the throttle body 11 may be entirely or partly made of metal. For example, a portion of the throttle body 11 may be made of resin for attaching to the cover member 44 and the remaining portion of the throttle body 11 may be made of metal, such as die-cast aluminum. In the case that the cover member 44 is attached to the throttle body 11 by means of adhesion, the throttle body 11 may be made of either resin or metal.

Another embodiment will now be described with reference to FIGS. 15 to 23. This embodiment is a modification of the above embodiment and is different from the above embodiment only in the configuration of the support member and the construction related to the support member. Therefore, like members are given the same reference numerals as the above embodiment and the description of these members will not be repeated.

Figure 18:
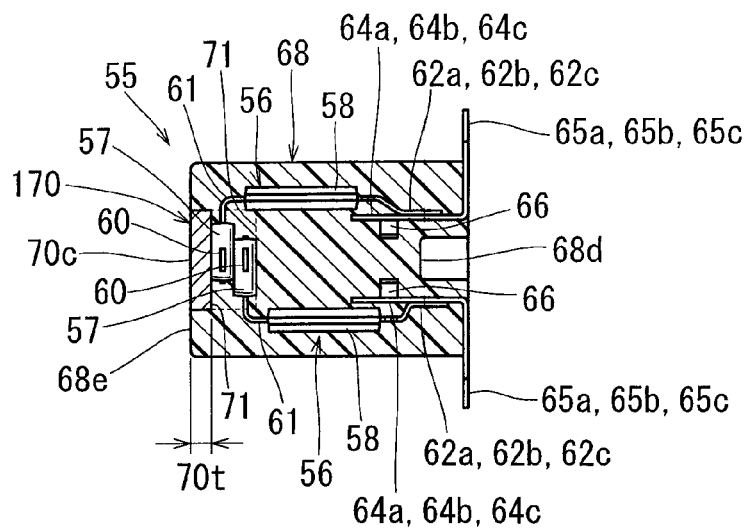
FIG. 18 is a cross-sectional view taken along line XVIII-XVIII in FIG. 15.
Figure 19:
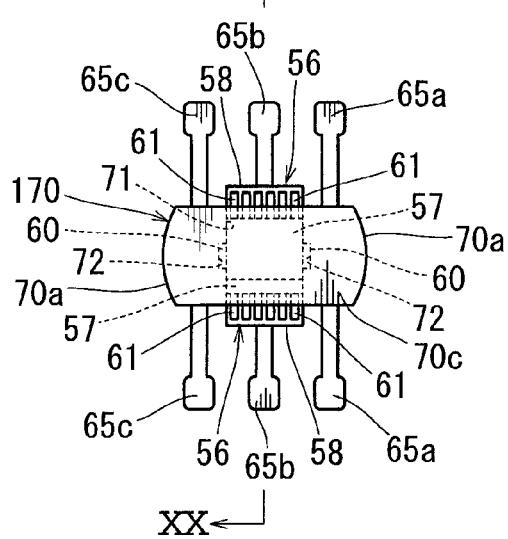
FIG. 19 is a front view showing the relation between magnetic detection devices and a support member.
Figure 20:
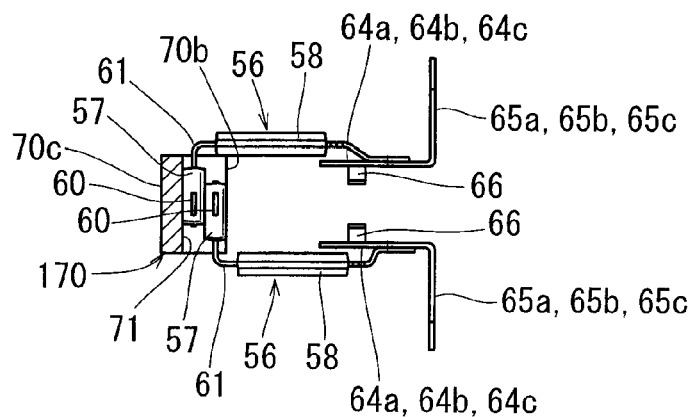
FIG. 20 is a cross-sectional view taken along line XX-XX in FIG. 19.
Figure 21:
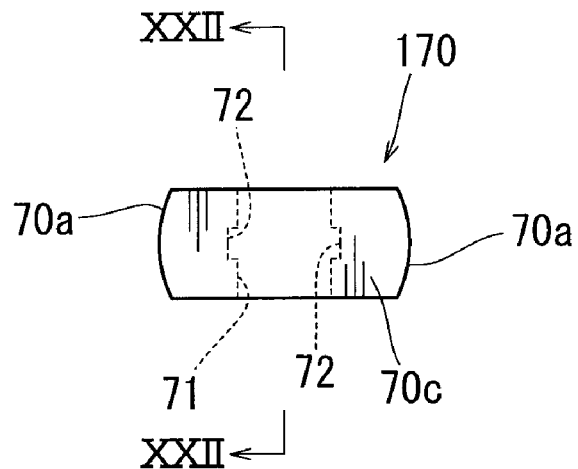
FIG. 21 is a front view of the support member.
Figure 22:
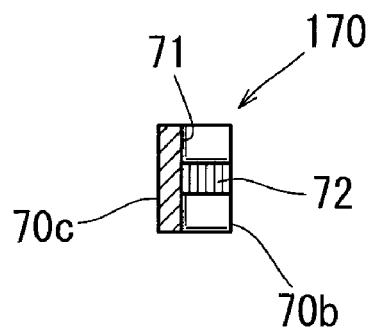
FIG. 22 is a cross-sectional view taken along line XXII-XXII in FIG. 21.
Figure 23:
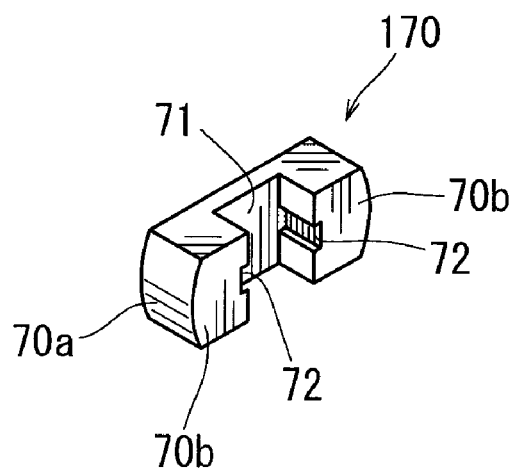
FIG. 23 is a perspective view of the support member.
Figure 24:
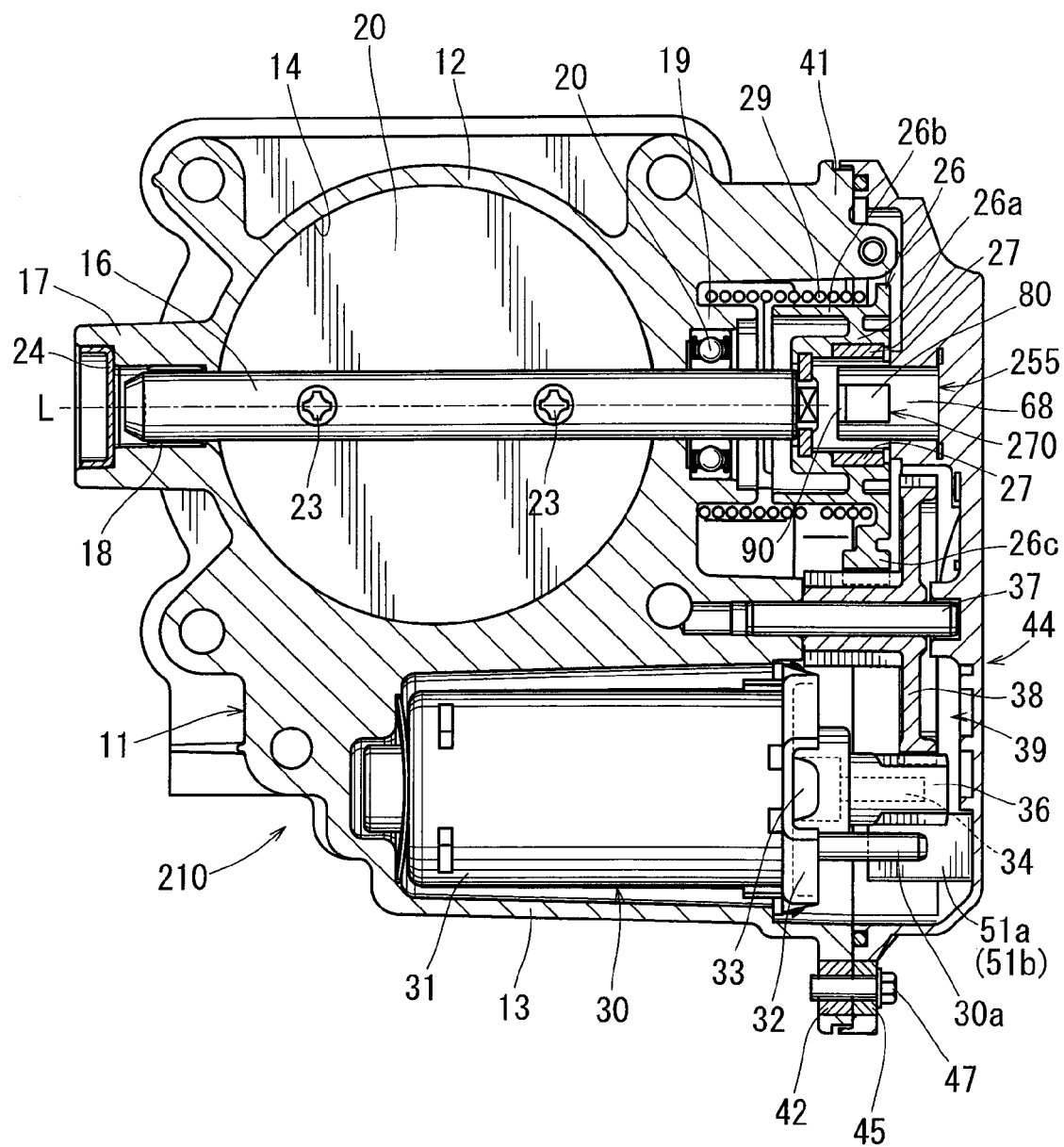
FIG. 24 is a cross-sectional view of a throttle device according to a further embodiment of the present invention.
Figure 25:
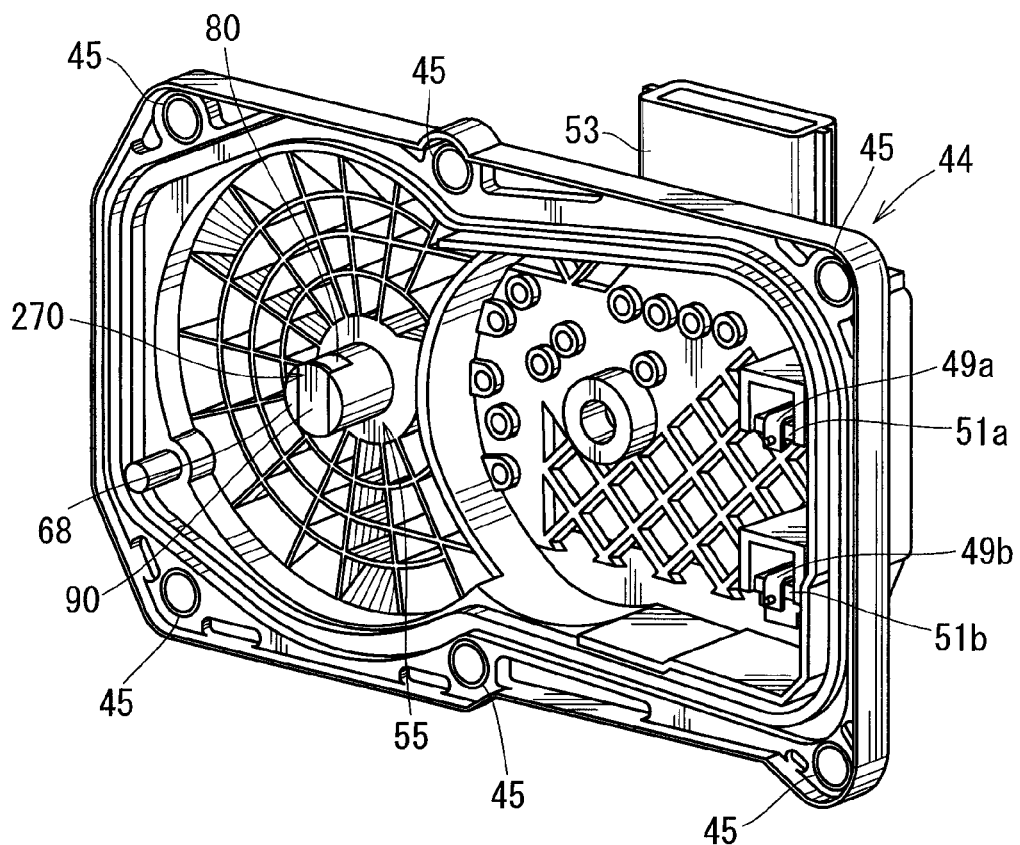
FIG. 25 is a perspective view as viewed from the backside of a cover member of the throttle device.
Figure 26:
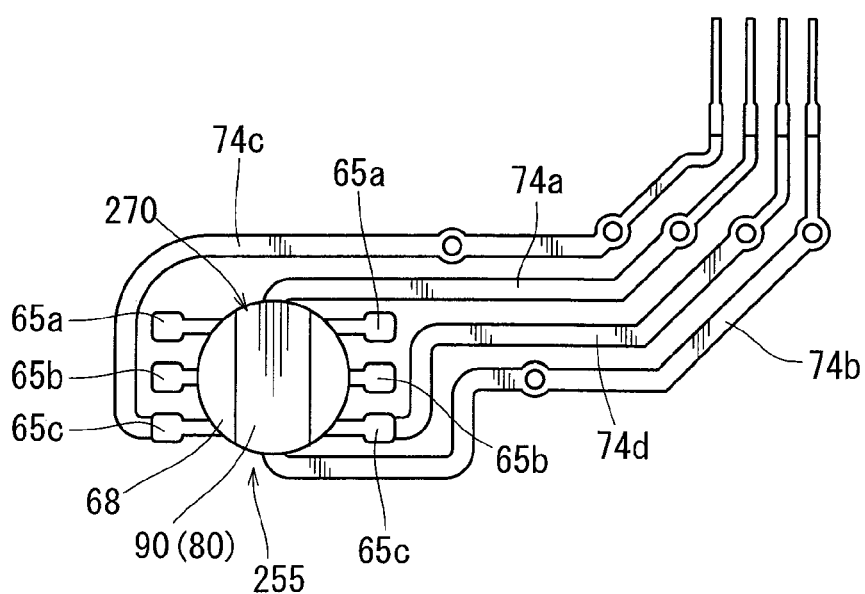
FIG. 26 is a front view of a rotational angle sensor of the throttle device and showing the state where sensor terminals are connected to the sensor.
Figure 27:
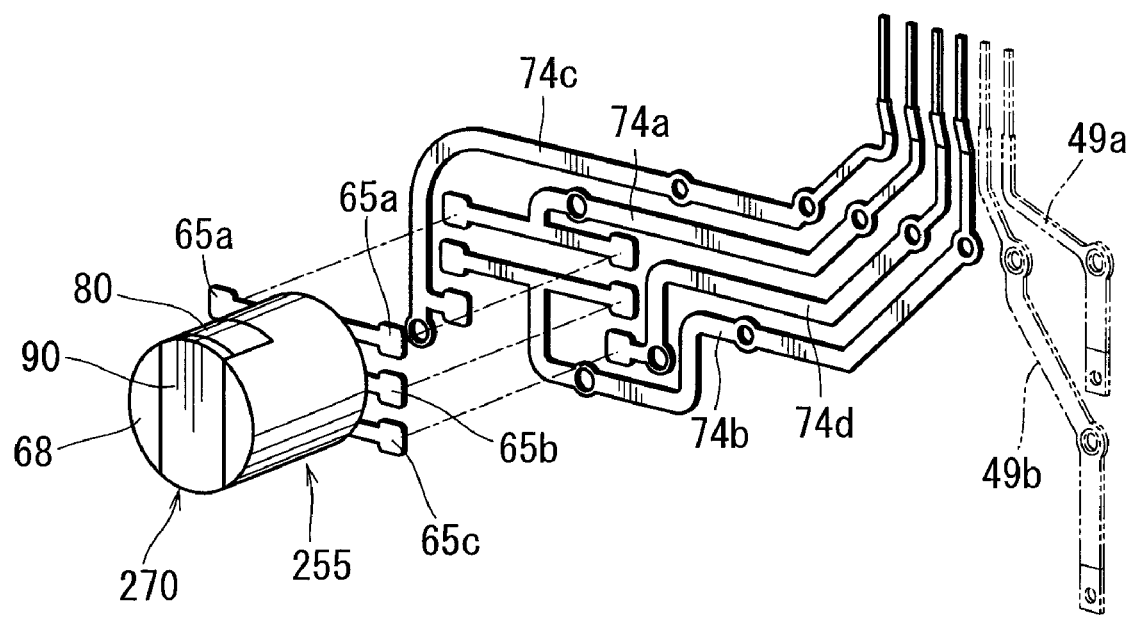
FIG. 27 is a perspective view of the rotational angle sensor and showing the state where the sensor terminals are not connected to the sensor.
Figure 28:
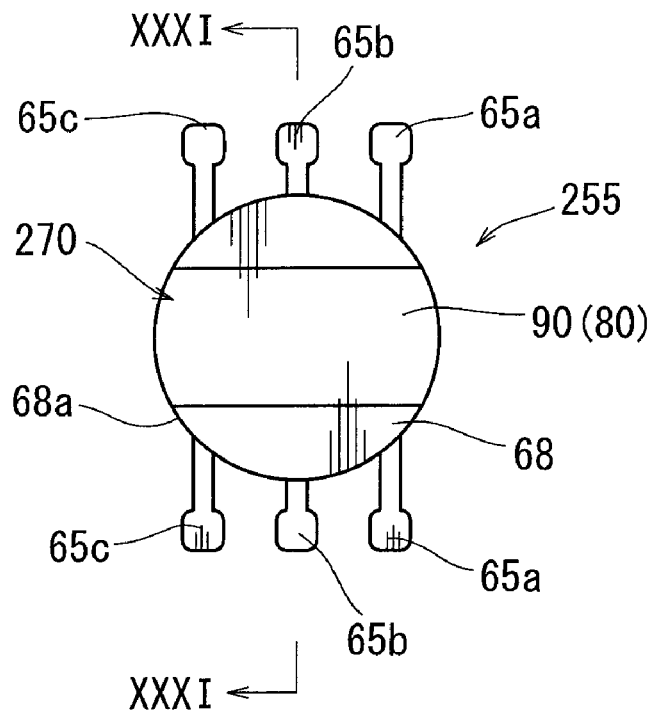
FIG. 28 is a front view of the rotational angle sensor.
Figure 29:
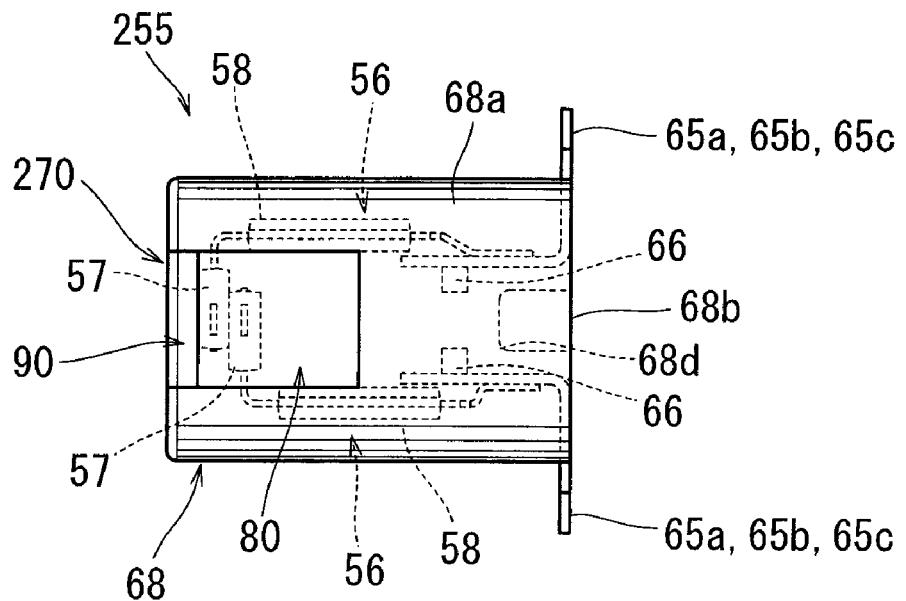
FIG. 29 is a side view of the rotational angle sensor.
Figure 30:
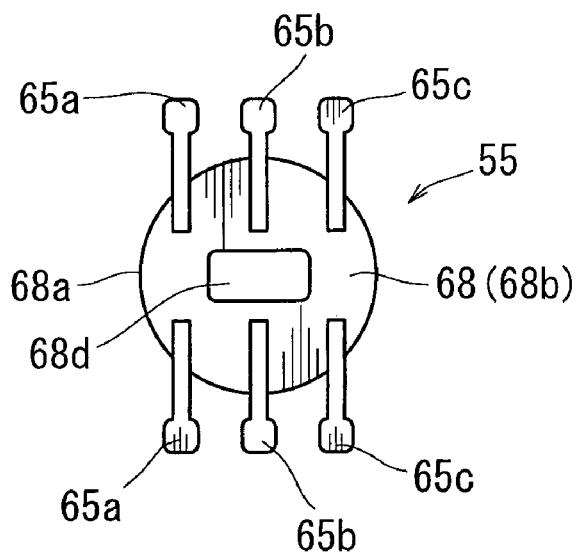
FIG. 30 is a rear view of the rotational angle sensor.
Figure 31:
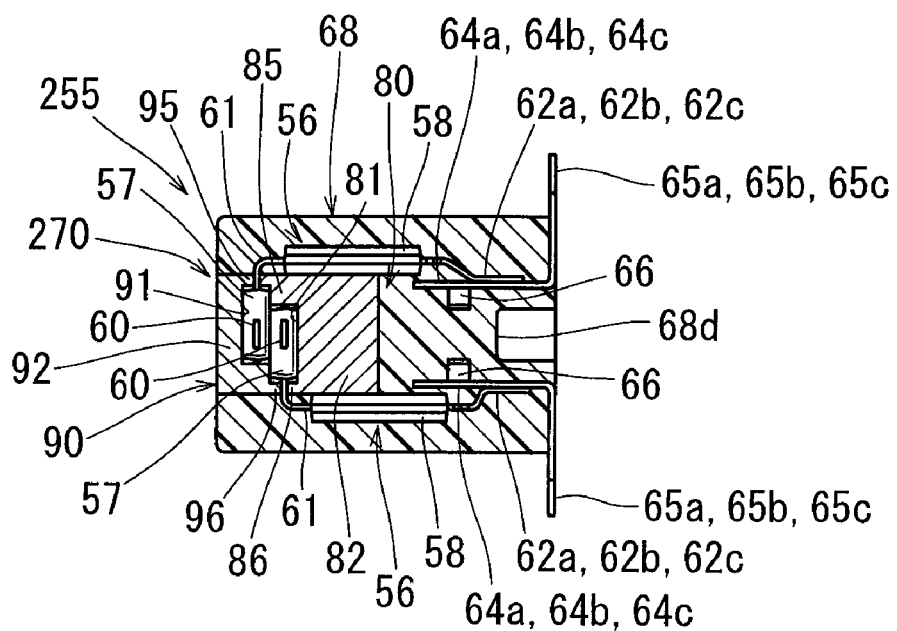
FIG. 31 is a cross-sectional view taken along line XXXI-XXXI in FIG. 28.

As shown in FIGS. 19 and 20, a support member 170 (see FIGS. 21 to 23) of this embodiment is different from the support member 70 of the above embodiment in that the direction for fitting the support member 170 with the sensing sections 57 of the magnetic detection devices 56 is opposite to the direction for fitting the support member 70 of the above embodiment. Thus, the support member 170 is fitted with the sensing sections 57 from the front side (left side as viewed in FIG. 18) of the sensing sections 57. In addition, a front face 70c of the support member 170 positioned on the opposite side of the positioning recess 71 is configured as a flat face. Further, the front face 70c extends flush with a front face 68e of the housing member 68 when the support member 170 has been integrated with the housing member 68 by the insertion molding process. As shown in FIG. 18, a thickness 70t of the support member 170 between the front face 70c and the bottom of the positioning recess 71 is smaller than the corresponding thickness of the support member 70.

For molding the housing member 86, the sub-assembly of the magnetic detection devices 56 and the support member 170 is inserted into a molding die (not shown) used for molding the housing member 68 and is held in position within the molding die. Thereafter, a resin is injected into the molding die, so that the sub-assembly is integrated with the housing member 68 as the housing member 68 is molded (insertion molding process). In addition to the side surfaces 70a, the front surface 70c of the support member 170 can serve as a reference surface for positioning the sub-assembly within the molding die. With the housing member 68 molded as described above, the side surfaces 70a of the support member

70 are exposed to the outside and extend in continuous with the outer side surface 68a of the housing member 68. In addition, the front face 70c of the support member 170 is exposed to the outside and extends flush with the front face 68e of the housing member 68.

According to this embodiment, in addition to the right and left faces, the front face of the support member 170 serves as the positioning portion or the reference face for positioning the support member 170 within the molding die used for molding the housing member 68. Therefore, the support member 170 is integrated with the housing member 68, while the support member 170 is positioned accurately at an aimed position relative to the housing member 68.

A further embodiment will now be described with reference to FIGS. 24 to 41. Also, this embodiment is a modification of the embodiment of FIGS. 1 to 14 and is different from this embodiment only in the configuration of the support member and the construction related to the support member. Therefore, like members are given the same reference numerals as the embodiment of FIGS. 1 to 14 and the description of these members will not be repeated.

Figure 32:
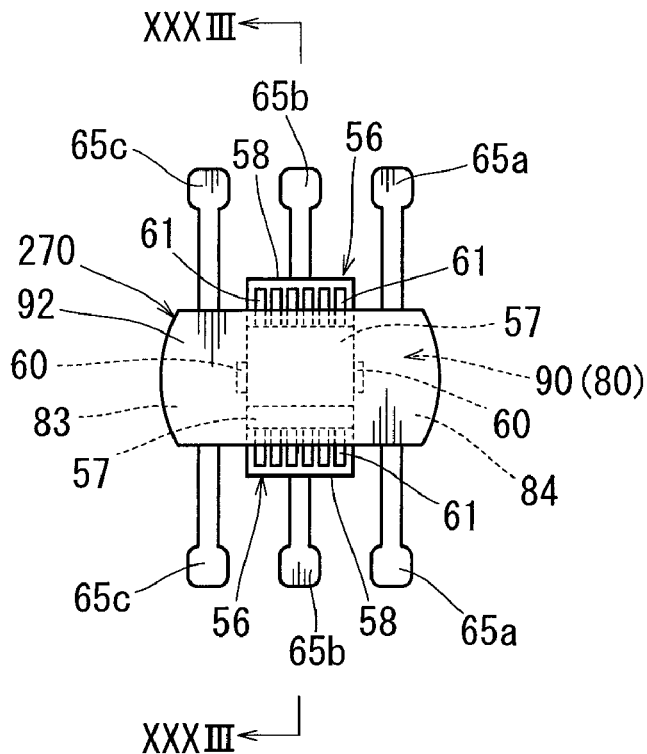
FIG. 32 is a front view showing the relating between magnetic detection devices and a support member of the rotational angle sensor.
Figure 33:
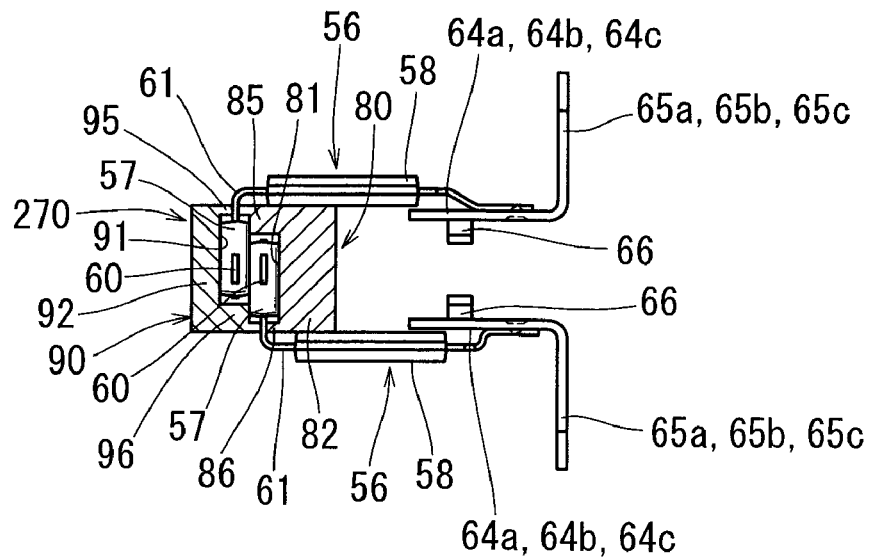
FIG. 33 is a cross-sectional view taken along line XXXIII-XXXIII in FIG. 32.
Figure 34:
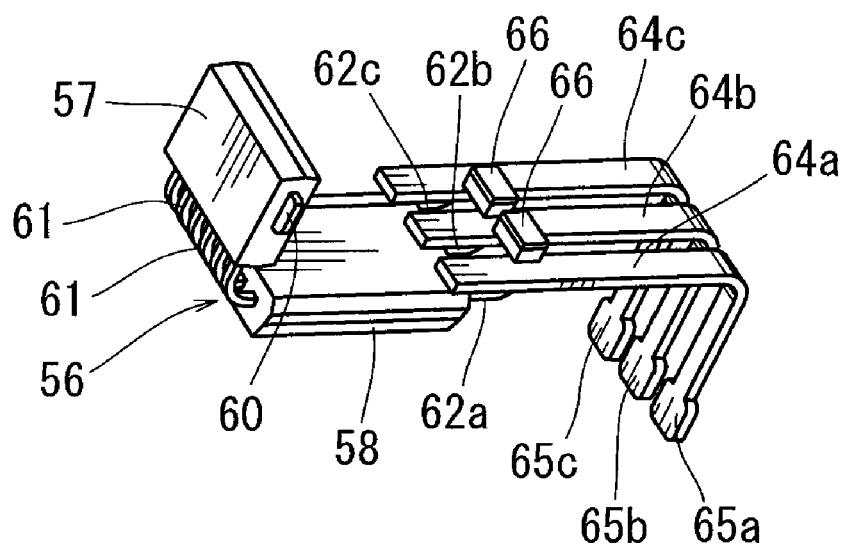
FIG. 34 is a perspective view of one of the magnetic detection devices.
Figure 35:
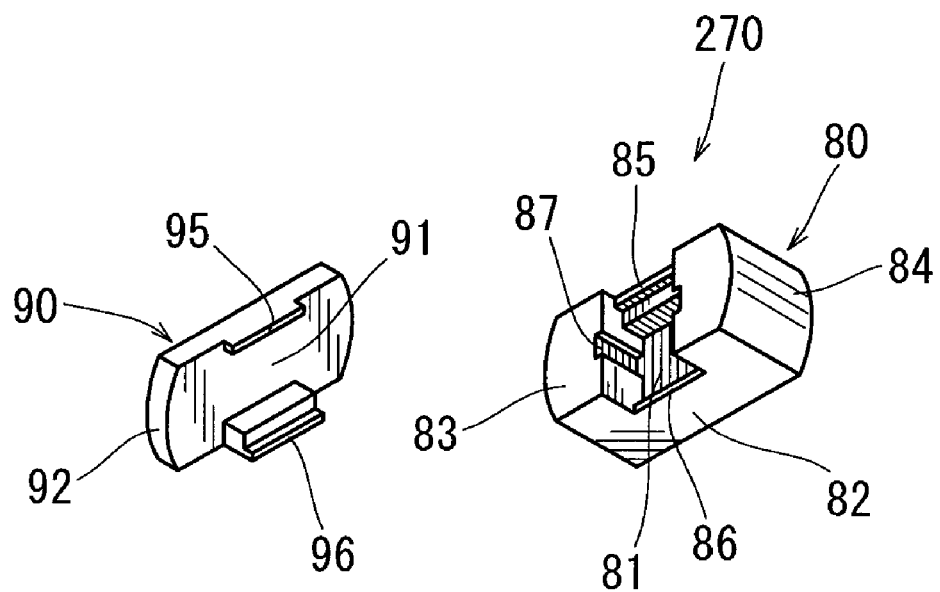
FIG. 35 is an exploded perspective view of the support member.

Referring to FIGS. 24 to 33 and 35, a throttle device 210 has a rotational angle sensor 255 that includes a stopper member 270. As shown in FIG. 35, the stopper member 270 is constituted by the combination of a first stopper segment 80 and a second stopper segment 90. More specifically, the first stopper segment 80 and the second stopper segment 90 are assembled together from the rear and front sides (right and left sides as viewed in FIG. 33) of the sensing sections 57 at a position between the computing sections 58, so that the sensing sections 57 of the magnetic detection devices 56 can be held in position. As shown in FIG. 33, the first stopper segment 80 and the second stopper segment 90 are positioned on the rear side and the front side, respectively, relative to each other.

Figure 36:
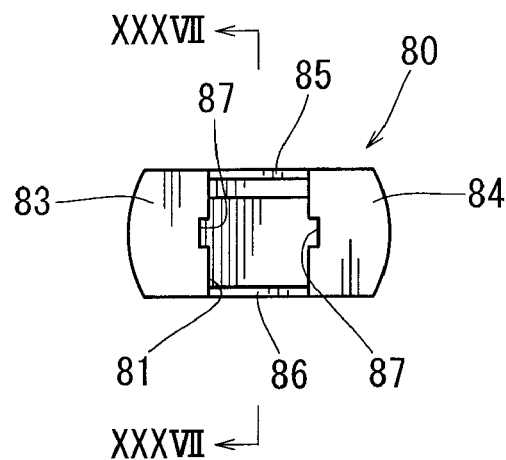
FIG. 36 is a front view of a first segment of the support member.
Figure 37:
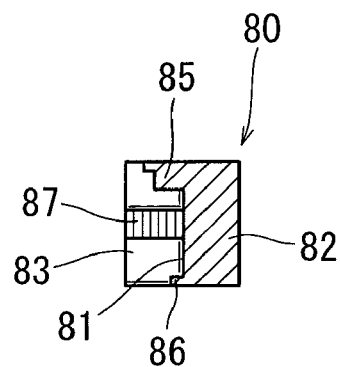
FIG. 37 is a cross-sectional view taken along line XXXVII-XXXVII in FIG. 36.
Figure 38:
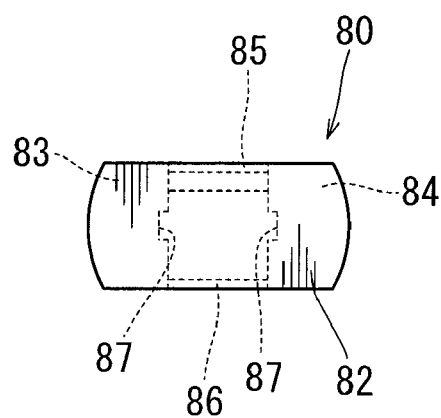
FIG. 38 is a rear view of the first segment.

The first stopper segment 80 will now be described. Referring to FIGS. 36 to 38, the first stopper segment 80 is made of resin and has a positioning recess 81 that is opened on its front side. The positioning recess 81 is configured such that the positioning recess 81 can be substantially closely fitted with the sensing sections 57 from their rear side (right side as viewed in FIG. 33) at a position between the computing sections 58 of the magnetic detection devices 56. The first stopper segment 80 has a rear wall portion 82, a left wall portion 83, a right wall portion 84, a top wall portion 85 and a bottom wall portion 86, which are configured to surround the positioning recess 81 (see FIG. 35). The front face of the rear wall portion 82 defining the bottom of the positioning recess 81 is configured to be able to contact the rear face of the rear side sensing section 57 (see FIG. 33). Opposing faces of the left wall portion 83 and the right wall portion 84 are configured to contact with end faces of the sensing sections 57 in face-to-face contact relation or to be positioned close to the end faces. Engaging recesses 87 are formed in the opposing faces of the left and right wall portions 83 and 84 (see FIGS. 36 and 37) for engaging and positioning the projections 60 that extend from the opposite end faces of the sensing sections 57

As shown in FIG. 33, the front edge of the upper wall portion 85 is configured such that the front edge can be positioned close to or can contact the rear sides of the conductive wires 61 that extend upward from the front side sensing section 57. The inner face (lower face as viewed in FIG. 33) of the upper wall portion 85 is configured as a stepped face with a front side portion, a rear side portion and a step portion positioned between the front and rear side portions. The rear side portion can be positioned close to or can contact the upper face of the rear side sensing section 57. The front side portion can be positioned closed to or can contact the upper end face of the rear half of the front side sensing section 57. The step portion can be positioned close to or can contact the rear face of the upper end portion of the front sensing section 57. The front edge of the bottom wall portion 86 can be positioned close to or can contact the rear sides of the conductive wires 61 that extend downward from the rear side sensing section 57. The inner face (upper face) of the bottom wall portion 85 can be positioned close to or can contact the bottom end face of the rear half of the rear side sensing section 57.

Figure 39:
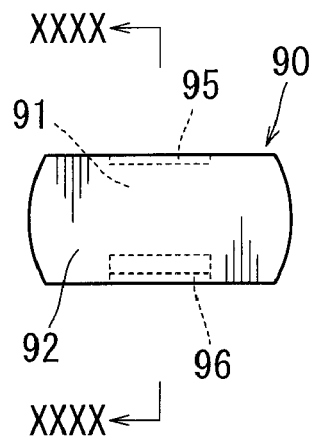
FIG. 39 is a front view of a second segment of the support member.
Figure 40:
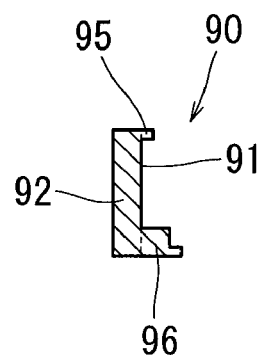
FIG. 40 is a cross-sectional view taken along line XXXX-XXXX in FIG. 39.
Figure 41:
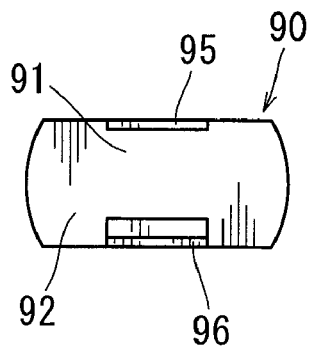
FIG. 41 is a rear view of the second segment of the support member.

The second stopper segment 90 will now be described with reference to FIGS. 39 to 41. Referring to these figures, the second stopper segment 90 is made of resin and has a positioning recess 91 opened on its rear side and right and left sides. The positioning recess 91 is configured such that the positioning recess 91 can be substantially closely fitted with the front sensing section 57 from its front side (left side as viewed in FIG. 33). The second stopper segment 90 has a front wall portion 92, a top wall portion 95 and a bottom wall portion 96, which are configured to surround the positioning recess 91. The rear face of the front wall portion 92 defining the bottom face of the positioning recess 91 can contact the front faces of the left and right wall portions 83 and 84 of the first stopper segment 80 in fact-to-face contact relation therewith. The top wall portion 95 and the bottom wall portion 96 are configured to closely fit between opposing faces of the left wall portion 83 and the right wall portion 84 of the first stopper segment 80.

As shown in FIG. 33, the rear edge of the top wall portion 95 can be positioned close to or can contact the front sides of the conductive wires 61 that extend upward from the front side sensing section 57. The inner face (lower face) of the top wall portion 95 can be positioned close to or can contact the upper end face of the front face of the front side sensing section 57. The inner face (upper face) of the bottom wall portion 96 is configured as a stepped face with a front side portion, a rear side portion and a step portion positioned between the front side portion and the rear side portion. The front side portion can be positioned close to or can contact the lower face of the front side sensing section 57. The rear side portion can be portioned close to or can contact the upper face of the front half of the sensing section 57. The step portion can be positioned close to or can contact the front face of the lower end portion of the rear side sensing section 57.

As shown in FIGS. 32 and 33, the first stopper segment 80 and the second stopper segment 90 are assembled with each other with the front and rear side sensing sections 57 positioned therebetween, so that the stopper member 270 can be formed to have a block-like configuration. In this assembled state, a substantially closed space is defined in the central portion of the stopper member 270 by the positioning recesses 81 and 91. The sensing sections 57 are received and positioned within this space. In addition, the projections 60 of the sensing sections 57 engage the engaging recesses 87 formed in the left and right wall portions 83 and 84 of the first stopper segment 80, so that the sensing sections 57 can be positioned also by this engagement. As a result, the stopper member 270 can position and support the sensing sections 57 of the magnetic detection devices 56.

The right and left faces of the stopper member 270 (right and left faces of the first and second stopper segments 80 and 90) are configured as arc-shaped curved faces that are continuous with the outer side face 68a of the housing member 68 when the topper member 270 has been integrated with the housing member 68 (see FIG. 28) by an insertion molding process. The right and left faces and the front face of the stopper member 270 serve as positioning portions or reference faces for positioning the stopper member 270 within a molding die (not shown) used for molding the housing member 68. The front face of the support member 270 (i.e., the front face of the second segment 90) is configured as a flat surface extending flush with the front face of the housing member 68 (see FIG. 31).

Each of the first and the second segments 80 and 90 is made of resin material that has a melting point higher than the melting point of the resin material of the housing member 68. For example, the resin material of the segments 80 and 90 may be polybutylene terephtalate (PBT). As described in connection with the embodiment shown in FIGS. 1 to 14, the resin material of the housing member 68 may be epoxy resin, and the resin material of the cover member 44 may be polybutylene terephtalate (PBT) or polyphenylene sulfide (PPS).

Similar to the embodiment shown in FIGS. 1 to 14, for molding the housing member 68, a sub-assembly of the magnetic detection devices 56 and the support member 270 is inserted into the molding die (not shown) used for molding the housing member 68 and is held in position within the molding die (insertion molding process). Thereafter, a resin is injected into the molding die, so that the sub-assembly is integrated with the housing member 68 as the housing member 68 is molded (see FIGS. 28 to 31). The right and left faces and the front face of the support member 270 can serve as reference faces for positioning the sub-assembly within the molding die. With the housing member 68 molded as described above, the right and left faces of the support member 270 are exposed to the outside and extend in continuous with the outer side surface 68a of the housing member 68. In addition, the connecting terminals 65a, 65b and 65c of the magnetic detection devices 56 are exposed to the outside from the rear surface 68b of the housing member 68. The other parts of the support member 270 and the magnetic detection devices 56 are embedded within the housing member 68. Further, the depression 68d is formed in the central portion of the rear surface 68b of the housing member 68 (see FIGS. 30 and 31).

According to the above embodiment, the sensing sections 57 of the magnetic detection devices 56 can be held in position within the stopper member 270, while the sensing sections 57 are substantially completely enclosed by the stopper member 270. Therefore, it is possible to further reliably prevent or minimize the potential degradation of the output characteristics of the magnetic detection devices 56, even if vibrations are externally applied to the sensing sections 57.

In addition, because the sensing sections 57 of the magnetic detection devices 56 are positioned within substantially the central portion of the stopper member 270, the sensing sections 57 can be reliably protected.

Because two separate stopper segments 80 and 90 constitute the stopper member 270, it is possible to easily position the stopper member 270 in order to enclose the sensing sections 57 of the magnetic detection devices 56.

Further, similar to the embodiment shown in FIGS. 15 to 23, in addition to the right and left faces, the front face of the support member 270 serves as the positioning portion or the reference face for positioning the support member 270 within the molding die that is used for molding the housing member 68. Therefore, after the support member 270 has been integrated with the housing member 68, the support member 270 is positioned accurately at an aimed position relative to the housing member 68.

The present invention may not be limited to the above embodiments but may be modified in various ways. For example, although the rotational angle sensor 55 is used for detecting the rotational angle of the throttle valve 22 of the throttle device 10(210), the rotational angle sensor 55(255) can be used for detecting the rotational angle of any other rotary members than a throttle device. In addition, although the throttle device 10(210) is electronically controlled, the present invention can be applied to a mechanically controlled throttle device, in which a throttle valve is opened and closed by the operation of an accelerator pedal via a link mechanism or a cable. Although a sensor IC including the sensing section 57 and the computing section 58 is used as the magnetic detection device 56, a Hall element or a Hall IC may be used as the magnetic detection device 56. Although the rotational angle of the throttle valve 22 is detected based on the change of direction of the magnetic field in the above embodiments, it is possible to detect the rotational angle based on the change of the intensity of the magnetic field produced between the permanent magnets 27. Although the magnetic detection device 56 has the sensing section 57 and the computing section 58 that are separated from each other, the sensing section 57 and the computing section 58 can be integrated within a single casing. It is also possible that the magnetic detection device 56 has only the sensing section 57. Although the sensor terminals 74a, 74b, 74c and 74d are connected to the corresponding connecting terminals 65a, 65b and 65c of the relay terminals 64a, 64b and 64c that are connected to the corresponding sensor terminals 62a, 63b, 62c of the magnetic detection devices 56, the sensor terminals 74a, 74b, 74c and 74b may be directly connected to the corresponding sensor terminals 62a, 62b and 62c. Although two magnetic detection devices 56 are provided, it is possible to incorporate only one magnetic detection device 56. Although the support member 70(170)(270) is configured as a one-piece element or is constituted by an assembly of two support segments, the support member may be constituted by an assembly of three or more support segments. In addition, the support member may be configured to position only the projections 60 of the magnetic detection devices 56. Further, the support member 70(170) (270) may be configured to position and/or protect not only the sensing sections 57 of the magnetic detection devices 56 but also the computing sections 58. It is possible to configure the support member 70(170)(270) such that the support member can position and/or protect the magnetic detection devices 56 in their entirety.

This invention claims:
1. A rotational angle sensor comprising:
    a magnetic detection device including a sensing section constructed to detect a change of a magnetic field produced by at least two magnets attached to a rotary member;
    a protective member constructed to protect at least the sensing section of the magnetic detection device; and
    a housing member molded integrally with the magnetic detection device and the protective member by an insertion molding process, such that the magnetic detection device and the protective member are embedded within the housing member;
    wherein the sensing section has at least one projection, and the protective member has at least one engaging recess engaging with the at least one projection, such that the sensing section is positioned relative to the protective member; and
    wherein the sensing section has a first projection and a second projection disposed on opposite sides of the sensing section, and the protective member has a first engaging recess and a second engaging recess for engaging the first projection and the second projection, respectively.

2. The rotational angle sensor as in claim 1, wherein:
the protective member is made of a first resin material having a first melting point; the housing member is made of a second resin material having a second melting point; and
the first melting point is higher than the second melting point.

3. The rotational angle sensor as in claim 1, wherein a part of the housing member, within which the sensing section of the magnetic detection device is disposed, has a substantially uniform thickness.

4. The rotational angle sensor as in claim 1, wherein the magnetic detection device includes a plurality of connecting terminals connected to corresponding terminals of a connector.

5. The rotational angle sensor as in claim 1, wherein the housing member is integrated with a stationary member by an insertion molding process, and a portion of the housing member having a predetermined configuration is not covered by the stationary member.

6. The rotational angle sensor as in claim 5, wherein the sensing section is positioned within the portion of the housing member having the predetermined configuration.

7. The rotational angle sensor as in claim 1, wherein the positioning member further includes a positioning recess, the sensing section is substantially closely fitted within the positioning recess, and the first and second engaging recesses are formed in opposite inner walls of the positioning recess.

8. A throttle device comprising:
a throttle body defining an intake air channel;
a throttle valve operable to open and close the intake air channel for controlling an amount of an intake air flowing through the intake air channel;
a rotary member coupled to the throttle valve;
at least two magnets attached to the rotary member; and
a rotational angle sensor attached to the throttle body for detecting a rotational angle of the throttle valve, the rotational angle sensor comprising:
a magnetic detection device including a sensing section constructed to detect a change of a magnetic field produced by the at least two magnets attached to the rotary member;
a protective member constructed to protect at least the sensing section of the magnetic detection device; and
a housing member attached to the throttle body and molded integrally with the magnetic detection device and the protective member by an insertion molding process, such that the magnetic detection device and the protective member are embedded within the housing member;
wherein the sensing section has at least one projection, and the protective member has at least one engaging recess engaging with the at least one projection, such that the sensing section is positioned relative to the protective member; and
wherein the sensing section has a first projection and a second projection disposed on opposite sides of the sensing section, and the protective member has a first engaging recess and a second engaging recess for engaging the first projection and the second projection, respectively.

9. The throttle device as in claim 8, further including a drive mechanism constructed to rotatably drive the throttle valve, wherein:
the throttle body includes a cover member constructed to cover the drive mechanism;
the housing member is integrated with the cover member by an insertion molding process; and
a portion of the housing member having a predetermined configuration is not covered by the cover member.

10. The throttle device as in claim 9, further comprising:
an electrically driven actuator coupled to the drive mechanism; and
a plurality of terminals for electrically connecting to the actuator; and
wherein the terminals are also integrated with the cover member by the insertion molding process.

11. The throttle device as in claim 9, wherein the cover member is joined to the throttle body by adhesion or welding.

12. The throttle body as in claim 8, wherein the protective member further includes a positioning recess, the sensing section is substantially closely fitted within the positioning recess, and the first and second engaging recesses are formed in opposite inner walls of the positioning recess.

13. A rotational angle sensor comprising:
a magnetic detection device including a sensing section and constructed to detect a change of a magnetic field produced by at least two magnets attached to a rotary member;
a positioning member; and
a housing member molded integrally with the magnetic detection device and the positioning member by an insertion molding process, such that the magnetic detection device and the protective member are embedded within the housing member;
wherein the sensing section has at least one projection, and the positioning member has at least one engaging recess engaging with the at least one projection, such that the sensing section is positioned relative to the positioning member; and
wherein the sensing section has a first projection and a second projection disposed on opposite sides of the sensing section, and the protective member has a first engaging recess and a second engaging recess for engaging the first projection and the second projection, respectively.

14. The rotational angle sensor as in claim 13, wherein the positioning member is configured to protect at least the sensing section of the magnetic detection device.

15. The rotational angle sensor as in claim 13, wherein the positioning member is configured to position the at least the sensing section of the magnetic detection device within a central portion of the positioning member.

16. The rotational angle sensor as in claim 13, wherein the positioning member comprises a plurality of positioning segments and is configured to enclose at lest the sensing section of the magnetic detection device.

17. The rotational angle sensor as in claim 13, wherein the positioning member comprises a positioning portion that is constructed and arranged to be positioned relative to a molding die used for molding the housing member.

18. The rotational angle sensor as in claim 13, comprising a plurality of magnetic detection devices each having the sensing section, wherein the positioning member is configured to be able to simultaneously position the sensing sections.

19. The rotational angle sensor as in claim 13, wherein the magnetic detection device includes a plurality of connecting terminals connected to corresponding terminals of a connector.

20. The rotational angle sensor as in claim 13, wherein the housing member is integrated with a stationary member by an insertion molding process, and a portion surrounding the sensing section of the magnetic detection device is not covered by the stationary member.

21. The rotational angle sensor as in claim 13, wherein the positioning member further includes a positioning recess, the sensing section is substantially closely fitted within the positioning recess, and the first and second engaging recesses are formed in opposite inner walls of the positioning recess.

22. A throttle device comprising:
a throttle body defining an intake air channel;
a throttle valve operable to open and close the intake air channel for controlling an amount of an intake air flowing through the intake air channel;
a rotary member coupled to the throttle valve;
at least two magnets attached to the rotary member; and
a rotational angle sensor attached to the throttle body for detecting a rotational angle of the throttle valve, the rotational angle sensor comprising:
a magnetic detection device including a sensing section constructed to detect a change of a magnetic field produced by the at least two magnets attached to the rotary member;
a positioning member; and
a housing member attached to the throttle body and integrated with the magnetic detection device and the positioning member by an insertion molding process, such that the magnetic detection device and the protective member are embedded within the housing member;
wherein the sensing section has at least one projection, and the positioning member has at least one engaging recess engaging with the at least one projection, such that the sensing section is positioned relative to the positioning member; and
wherein the sensing section has a first projection and a second projection disposed on opposite sides of the sensing section, and the protective member has a first engaging recess and a second engaging recess for engaging the first projection and the second projection, respectively.

23. The throttle device as in claim 22, further comprising a drive mechanism constructed to rotatably drive the throttle valve, and wherein the throttle body includes a detachable cover member for covering the drive mechanism.

24. The rotational angle sensor as in claim 22, wherein the positioning member further includes a positioning recess, the sensing section is substantially closely fitted within the positioning recess, and the first and second engaging recesses are formed in opposite inner walls of the positioning recess.

25. A sensor comprising:
a magnetic detection device having a sensing section constructed to detect a change of a magnetic field;
a first member made of a first resin material and engaged with at least the sensing section of the magnetic detection device; and
a second member made of a second resin material and molded integrally with the magnetic detection device and the first member, so that the magnetic detection device and the first member are embedded within the second member;
wherein the sensing section has at least one projection, and the first member has at least one engaging recess engaging with the at least one projection, such that the sensing section is positioned relative to the first member; and
wherein the sensing section has a first projection and a second projection disposed on opposite sides of the sensing section, and the protective member has a first engaging recess and a second engaging recess for engaging the first projection and the second projection, respectively.

26. The sensor as in claim 25, wherein the first resin material is different from the second resin material.

27. The sensor as in claim 26, wherein:
the first resin material has a first melting point;
the second resin material has a second melting point; and
the first melting point is higher than the second melting point.

28. The rotational angle sensor as in claim 25, wherein the first member further includes a positioning recess, the sensing section is substantially closely fitted within the positioning recess, and the first and second engaging recesses are formed in opposite inner walls of the positioning recess.

29. A sensor comprising:
a magnetic detection device having a sensing section constructed to detect a change of a magnetic field;
a first member made of a first resin material; and
a second member made of a second resin material and holding the magnetic detection device and the first member,
wherein the sensing section has a first projection and a second projection disposed on opposite sides of the sensing section, and the first member is provided with a first engaging recess and a second engaging recess engaged with the first projection and the second projection, respectively, and
wherein the magnetic detection device and the first member are embedded within the second member.

30. The sensor as in claim 29, wherein the first resin material is different from the second resin material.

31. The sensor as in claim 30, wherein:
the first resin material has a first melting point;
the second resin material has a second melting point; and
the first melting point is higher than the second melting point.

32. The rotational angle sensor as in claim 29, wherein the first member further includes a positioning recess, the sensing section is substantially closely fitted within the positioning recess, and the first and second engaging recesses are formed in opposite inner walls of the positioning recess.

* * * * *